United States Patent
Abesingha et al.

(10) Patent No.: US 12,040,692 B2
(45) Date of Patent: Jul. 16, 2024

(54) CIRCUITS AND METHODS FOR GENERATING A CONTINUOUS CURRENT SENSE SIGNAL

(71) Applicant: Murata Manufacturing Co., Ltd., Nagaokakyo (JP)

(72) Inventors: Buddhika Abesingha, San Diego, CA (US); Tim Wen Hui Yu, Fremont, CA (US)

(73) Assignee: Murata Manufacturing Co., Ltd., Nagaokakyo (JP)

( * ) Notice: Subject to any disclaimer, the term of this patent is extended or adjusted under 35 U.S.C. 154(b) by 0 days.

(21) Appl. No.: 17/830,639

(22) Filed: Jun. 2, 2022

(65) Prior Publication Data

US 2023/0396141 A1    Dec. 7, 2023

(51) Int. Cl.
*H02M 1/00*    (2007.01)
*H02M 1/12*    (2006.01)

(52) U.S. Cl.
CPC ....... *H02M 1/0009* (2021.05); *H02M 1/0087* (2021.05); *H02M 1/123* (2021.05)

(58) Field of Classification Search
CPC ...... H02M 7/519; H02M 7/521; H02M 7/523; H02M 7/75; H02M 7/757; H02M 7/7575;
(Continued)

(56) References Cited

U.S. PATENT DOCUMENTS 8,278,895 B2    10/2012    Gardner et al.
8,710,810 B1 *   4/2014    McJimsey ............. H02M 3/158
                                                        323/283
(Continued)

FOREIGN PATENT DOCUMENTS

EP    0884746 B1    9/2002
EP    3388917 A2    10/2018

OTHER PUBLICATIONS

International Search Report and Written Opinion issued for International PCT Application No. PCT/US2023/023589 filed on May 25, 2023 on behalf of pSemi Corporation. Mail Date: Sep. 11, 2023. 12 pages.

*Primary Examiner* — Thienvu V Tran
*Assistant Examiner* — Nusrat Quddus
(74) *Attorney, Agent, or Firm* — Steinfl + Bruno LLP

(57) ABSTRACT

Methods and devices for sensing current through a power converter circuit are presented. According to one aspect, currents through high-/low-side transistors are sensed via respective reduced size replica transistors. According to another aspect, the sensed currents are used to generate bridging currents that are combined with the sensed currents to generate a continuous current sense signal. According to another aspect, the bridging currents include slopes that are generated from slopes of the sensed currents. According to another aspect, the sensed currents are combined and filtered to generate a continuous sense signal. According to another aspect, the continuous current sense signal is a voltage that is compared to a reference voltage to generate a current limit status flag used to control operation of the power converter circuit. According to other aspects, the current sense voltage is used to control ON/OFF duty cycle of the power converter circuit.

35 Claims, 33 Drawing Sheets

(58) Field of Classification Search
CPC .......... H02M 7/66; H02M 7/68; H02M 7/72;
H02M 7/483; H02M 2007/4835; H02M
7/487; H02M 1/08; H02M 1/084; H02M
1/0845; H02M 7/515; H02M 7/525;
H02M 7/527; H02M 7/529; H02M 7/539;
H02M 1/12; H02M 3/3155; H02M
3/33507; H02M 3/33546; H02M 7/1557;
H02M 7/1626; H02M 1/4208; H02M
7/53871; H02M 7/12; H02M 7/219;
H02M 7/151; H02M 1/4233; H02M
5/4585; H02M 7/217; H02M 7/1552;
H02M 7/1623; H02M 1/4225; H02M
3/33592; H02M 3/073; H02M 3/10;
H02M 3/135; H02M 3/137; H02M 7/10;
H02M 7/00; H02M 7/06; H02M 7/064;
H02M 7/068; H02M 3/07; H02M 7/103;
H02M 7/106; H02M 1/088; H02M
2003/071; H02M 2003/072; H02M
2003/075; H02M 2003/076; H02M
2003/077; H02M 2003/078; H02M
2001/007; H02M 2001/0048; H02M 3/22;
H02M 1/36; H02M 3/24; H02M 3/325;
H02M 3/335; H02M 3/28; H02M
3/33569; H02M 2007/4815; H02M
2007/4818; H02M 1/083; H02M 3/33538;
H02M 3/33515; H02M 3/33576; H02M
3/33553; H02M 3/33523; G05F 1/30;
G05F 1/33; G05F 1/32; G05F 1/34; G05F
1/38; G05F 1/52; H02J 7/12; Y02B
70/1491
See application file for complete search history.

(56) References Cited

U.S. PATENT DOCUMENTS

| | | | |
|---|---|---|---|
| 9,420,645 B2 | 8/2016 | Yan et al. | |
| 9,525,351 B2* | 12/2016 | Li | G01R 19/0092 |
| 9,543,836 B2 | 1/2017 | Kurokawa et al. | |
| 9,722,506 B2 | 8/2017 | Pastore et al. | |
| 9,853,548 B1* | 12/2017 | Zhang | H02M 1/08 |
| 9,866,113 B1* | 1/2018 | Assaad | H02M 3/158 |
| 10,063,146 B1* | 8/2018 | Lee | G01R 19/003 |
| 10,090,751 B1* | 10/2018 | Tsyrganovich | H03K 17/0822 |
| 10,250,135 B2 | 4/2019 | Yu et al. | |
| 10,432,093 B2* | 10/2019 | Cheng | H02M 1/084 |
| 10,601,318 B2 | 3/2020 | Flaibani et al. | |
| 10,848,060 B1* | 11/2020 | Unno | H02M 3/158 |
| 10,862,472 B1* | 12/2020 | Zannoth | H03K 17/063 |
| 11,196,339 B1* | 12/2021 | Jodka | H02M 1/08 |
| 11,489,445 B2* | 11/2022 | Yan | G01R 31/40 |
| 11,789,048 B2* | 10/2023 | Poletto | G01R 19/16547 324/546 |
| 11,804,777 B2* | 10/2023 | Chen | H02M 3/1584 |
| 2007/0229050 A1 | 10/2007 | Shigeta et al. | |
| 2008/0238390 A1* | 10/2008 | Trivedi | H02M 3/1584 323/283 |
| 2010/0277142 A1* | 11/2010 | Tan | H02M 7/53803 323/268 |
| 2011/0234188 A1* | 9/2011 | Chiu | H02M 1/14 323/282 |
| 2012/0126765 A1* | 5/2012 | Stone | H02M 3/1588 323/283 |
| 2012/0229107 A1* | 9/2012 | Chen | H02M 3/1588 323/271 |
| 2013/0015830 A1* | 1/2013 | Zhang | H02M 3/1588 323/282 |
| 2014/0015500 A1* | 1/2014 | Babazadeh | H02M 3/1584 323/272 |
| 2014/0191737 A1 | 7/2014 | Nagasawa et al. | |
| 2016/0043642 A1* | 2/2016 | Xu | H02M 1/08 323/271 |
| 2016/0233766 A1* | 8/2016 | Todorov | H02M 3/1584 |
| 2019/0058398 A1* | 2/2019 | Sharifi | H02M 3/06 |
| 2019/0081546 A1* | 3/2019 | Hsu | H02M 3/158 |
| 2019/0229717 A1* | 7/2019 | Tajima | G11C 27/02 |
| 2019/0238124 A1 | 8/2019 | Tajima | |
| 2019/0363625 A1* | 11/2019 | Kirchner | H02M 3/158 |
| 2019/0379270 A1 | 12/2019 | Pullen et al. | |
| 2020/0280311 A1* | 9/2020 | Morini | H02M 1/08 |
| 2021/0036524 A1* | 2/2021 | Womac | H02J 7/00 |
| 2021/0067041 A1 | 3/2021 | Cho et al. | |
| 2021/0159788 A1 | 5/2021 | Kasturi | |
| 2021/0351687 A1 | 11/2021 | Fang et al. | |
| 2021/0364554 A1* | 11/2021 | Chen | G01R 19/16538 |
| 2022/0345040 A1* | 10/2022 | Couleur | H02M 1/0009 |
| 2023/0299674 A1* | 9/2023 | Liu | H02M 3/06 323/271 |
| 2024/0030799 A1* | 1/2024 | Yang | H02M 3/158 |

* cited by examiner

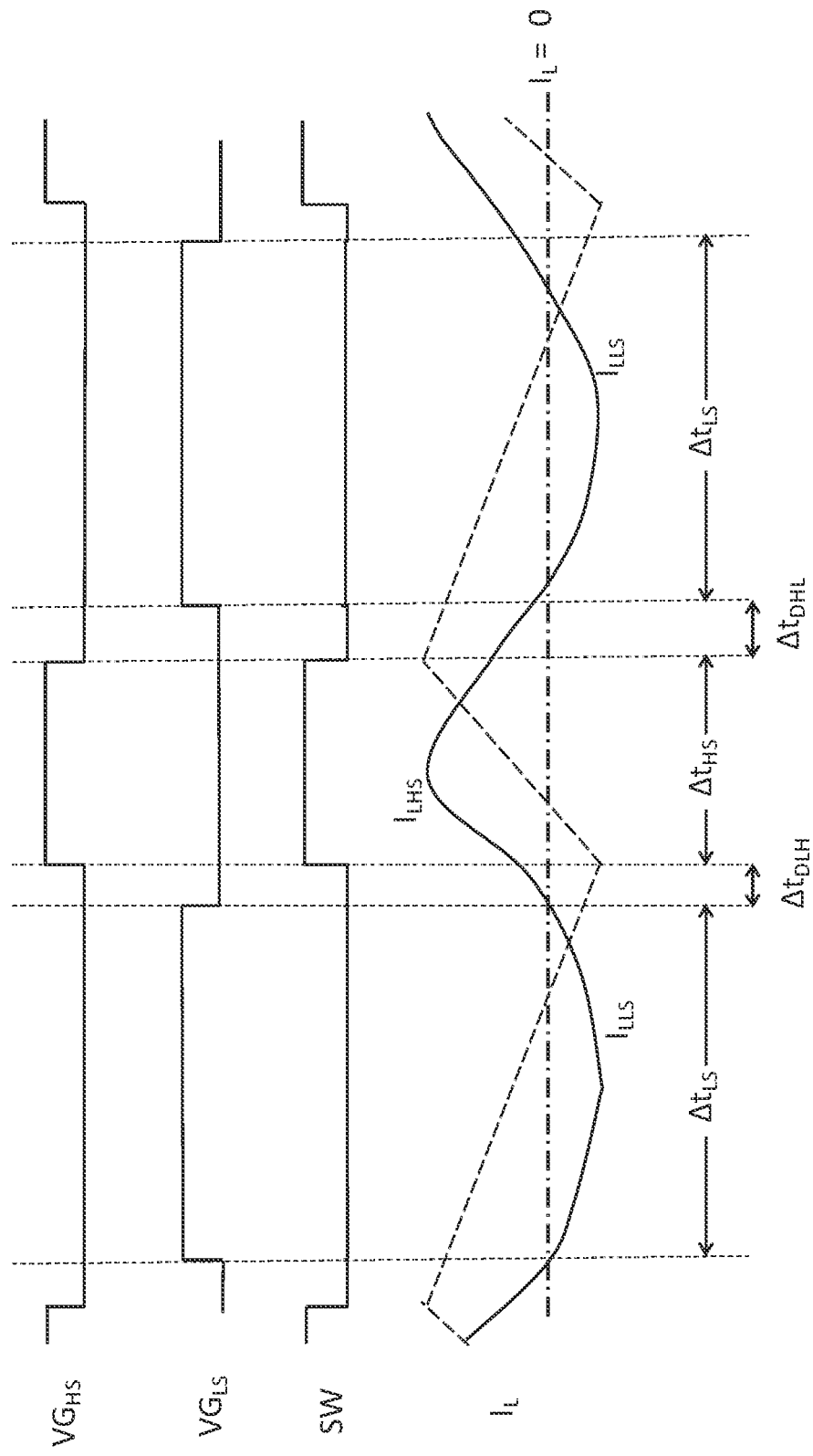
FIG. 1C  *PRIOR ART*

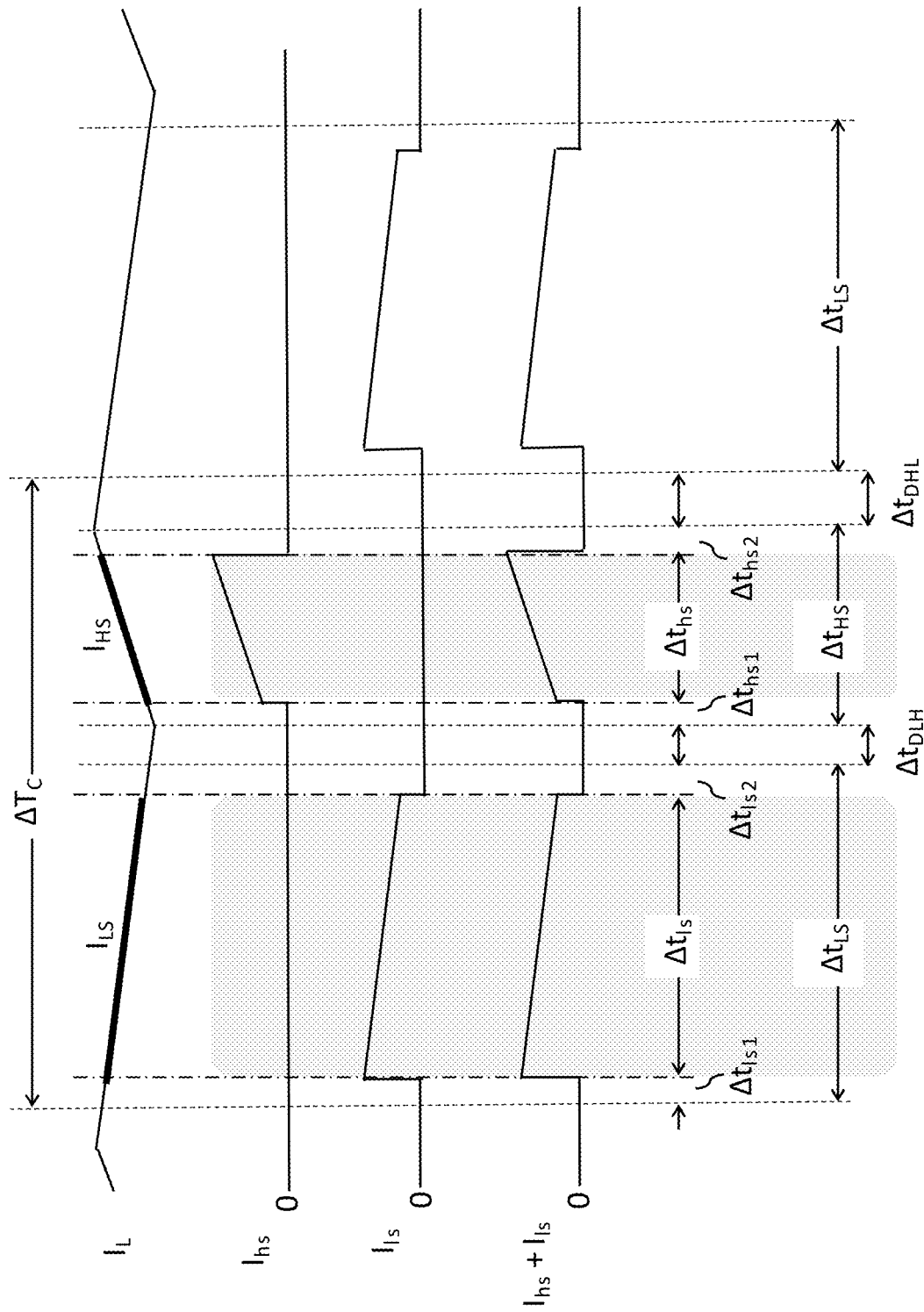

CIRCUITS AND METHODS FOR GENERATING A CONTINUOUS CURRENT SENSE SIGNAL

TECHNICAL FIELD

The present disclosure is related to electronic circuits, and more particularly to circuits and methods for sensing current through power converter circuits.

BACKGROUND

FIG. 1A shows a simplified block diagram (100A) of a (prior art) power converter circuit (100A, e.g., buck converter) that may be used to convert a high voltage, $V_{IN}$, to (a lower) output voltage, $V_{OUT}$, through a switching circuit comprising transistors ($M_{HS}$, $M_{LS}$). Operation of the switching circuit, including gate drive voltages ($VG_{HS}$, $VG_{LS}$) for ON/OFF control of the transistors ($M_{HS}$, $M_{LS}$) may be provided by a timing control and drive circuit block (102) that may be powered by a low voltage supply, $V_{DD}$, and in some cases, by the high voltage, $V_{IN}$. As shown in FIG. 1A, the high-side transistor, $M_{HS}$, and the low-side transistor, $M_{LS}$, are arranged in series-connection between the high voltage, $V_{IN}$, and a reference ground, GND, wherein a common/switching node, SW, provides a coupling between the two transistors. Alternate ON (or OFF) switching of the transistors ($M_{HS}$, $M_{LS}$) may cause a switching voltage at the node, SW, that may switch to a level substantially equal (e.g., within a drain-to-source voltage drop of $M_{HS}$) to the high voltage, $V_{IN}$, when the high-side transistor, $M_{HS}$, is ON, and to a level of the reference ground, GND, when the low-side transistor, $M_{LS}$, is ON. An inductor, L, coupled to the switching node, SW, may provide a (continuous) current conduction path for a load current, $I_L$, to a load (105) for output of the voltage $V_{OUT}$. A combination of a capacitor (e.g., $C_{OUT}$) provided in the load (105) and an ON/OFF duty cycle of the high-side transistor, $M_{HS}$, may establish a DC level of the voltage, $V_{OUT}$. Teachings according to the present disclosure provide circuits and methods for sensing the load current, $I_L$.

SUMMARY

According to a first aspect of the present disclosure, a current sensing circuit for a power converter is presented, comprising: a high-side (HS) current sensing circuit comprising a HS sensing device configured to sense, during a HS sensing time interval, a HS current through a conducting HS transistor of the power converter; a low-side (LS) current sensing circuit comprising a LS sensing device configured to sense, during a LS sensing time interval, a LS current through a conducting LS transistor of the power converter; a current combiner circuit coupled to the HS and LS current sensing circuits, the current combiner circuit configured to combine the HS current and the LS current and generate therefrom a combined continuous sensing current, and an energy storage element directly or indirectly coupled to sensed HS and LS currents, wherein the HS sensing time interval and the LS sensing time interval are separate and non-overlapping.

According to a second aspect of the present disclosure, a power converter circuit is presented, comprising: a high-side (HS) transistor and a low-side (LS) transistor in series connection and coupled between a first voltage and a reference ground; an inductor coupled to a source of the HS transistor and to a drain of the LS transistor at a common switching node; and a current sensing circuit coupled to the HS and LS transistors, the current sensing circuit comprising: a high side (HS) current sensing circuit configured to sense a HS current through the HS transistor; and a low side (LS) current sensing circuit configured to sense a LS current through the LS transistor; and wherein during operation of the power converter circuit, the current sensing circuit senses the HS and LS currents and generates therefrom a filtered voltage that is representative of a load current through the inductor.

According to a third aspect of the present disclosure, a multi-phase power converter circuit is presented, comprising: a plurality of power conversion phases coupled to a common subcircuit, each phase of the plurality of power conversion phases comprising: a high-side (HS) transistor and a low-side (LS) transistor coupled between a first voltage and a reference ground; an inductor coupled, at a first terminal of the inductor, to a source of the HS transistor and to a drain of the LS transistor at a common switching node, and at a second terminal of the inductor, to the common subcircuit; and a current sensing circuit coupled to the HS and LS transistors, the current sensing circuit comprising: a high side (HS) current sensing circuit configured to sense a HS current through the HS transistor and a low side (LS) current sensing circuit configured to sense a LS current through the LS transistor, wherein during operation of the multiphase power converter circuit, the current sensing circuit of each phase senses the HS and LS currents and generates therefrom the filtered voltage that is representative of a phase load current through the inductor that is conducted to the common subcircuit.

According to a fourth aspect of the present disclosure, a method for sensing a load current of a power converter is presented, the method comprising: coupling high-side (HS) and low-side (LS) sensing devices to respective HS and LS transistors of the power converter; based on the coupling, conducting HS and LS sensing currents through the HS and LS sensing devices during respective HS and LS sensing time intervals, the HS and LS sensing currents ratiometrically related to currents through the HS and LS transistors; and combining the HS and LS sensing currents to generate a combined continuous sensing current, wherein the HS sensing time interval and the LS sensing time interval are separate and non-overlapping Further aspects of the disclosure are provided in the description, drawings and claims of the present application.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 1B and FIG. 1C show graphs representative of waveforms of signals during operation of the power converter of FIG. 1A.

FIG. 2C shows a discontinuity in a current sensed by the current sensing circuits of FIG. 2A.

DETAILED DESCRIPTION

Figure 1A:
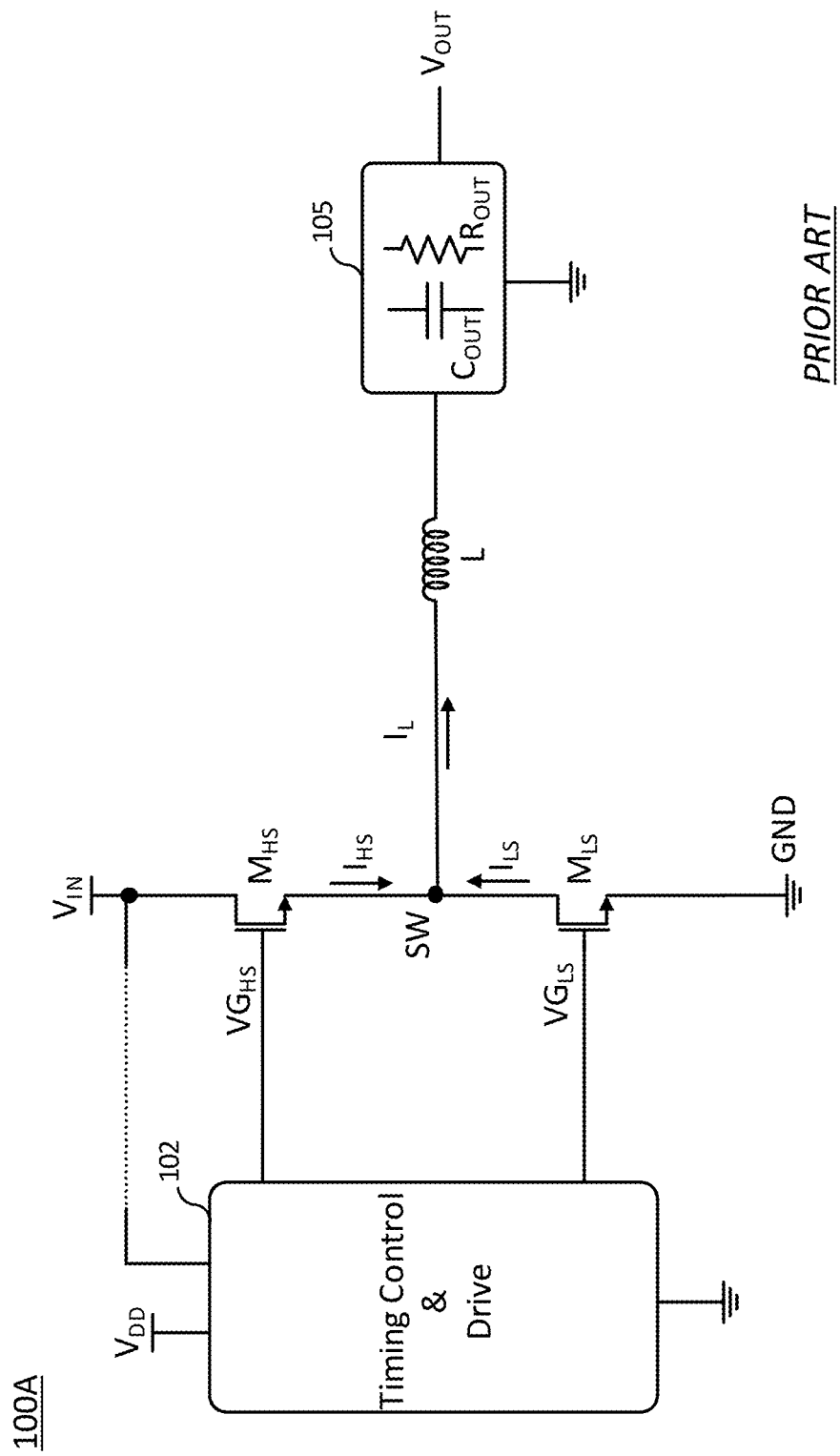
FIG. 1A shows a simplified block diagram of a (prior art) power converter circuit.

With further reference to FIG. 1A, during an ON state of the high-side transistor, $M_{HS}$, the load current, $I_L$, may be based on (e.g., equal to) a current, $I_{HS}$, that flows from the high voltage, $V_{IN}$, through the high-side transistor, $M_{HS}$, and through the inductor, L, and during an ON state of the low-side transistor, $M_{LS}$, the load current, $I_L$, may be based on (e.g., equal to) a current, $I_{LS}$, that flows from the reference ground, GND, through the low-side transistor, $M_{LS}$, and through the inductor L. Accordingly, while the transistors ($M_{HS}$, $M_{LS}$) may not be simultaneously conducting (i.e., ON, ON state, active, activated), the load current, $I_L$, may be a continuous current as shown in FIG. 1B.

Figure 1B:
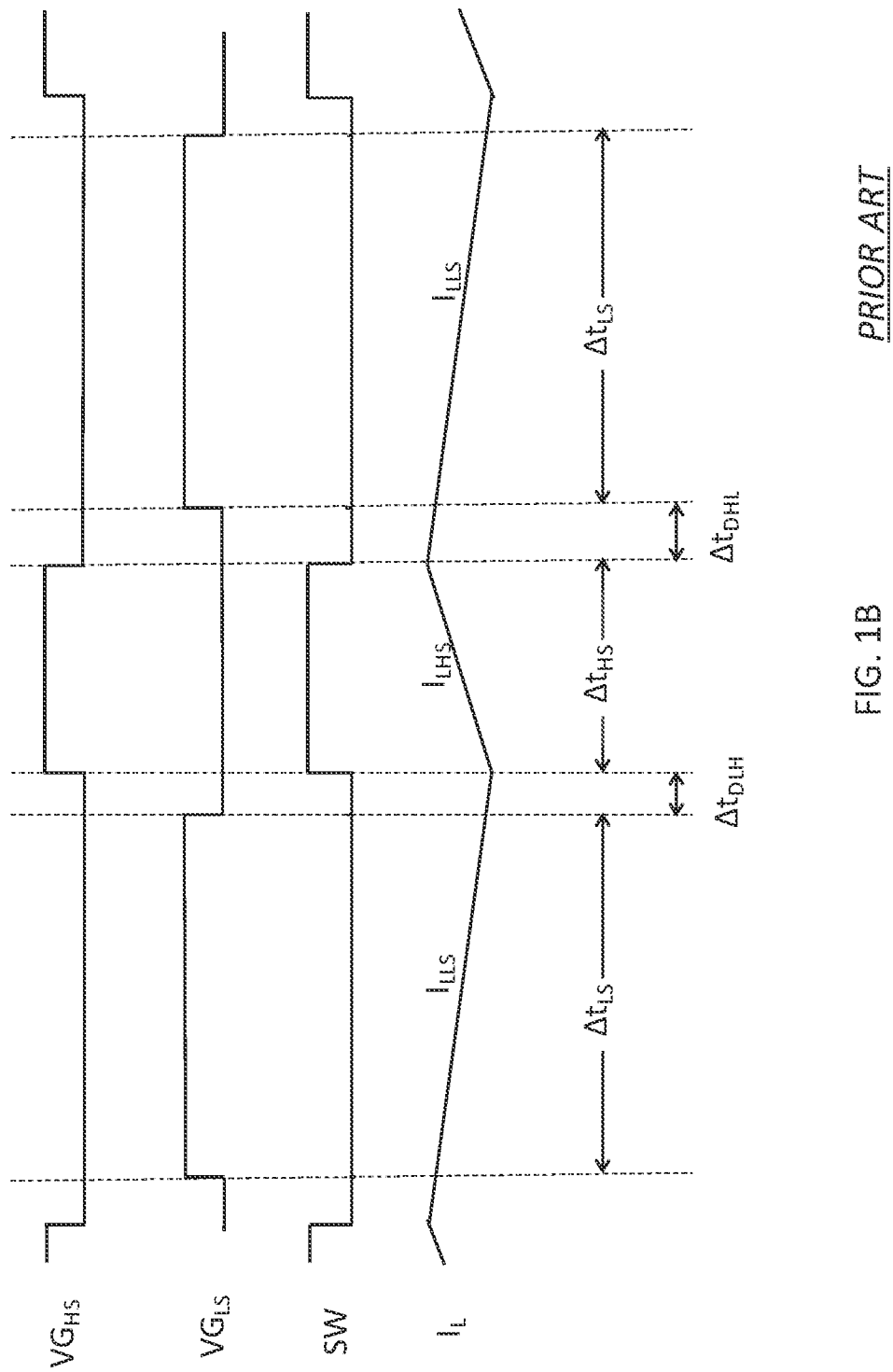

FIG. 1B shows graphs representative of waveforms of signals during operation of the power converter of FIG. 1A, operation being based on ON and OFF states of each of the transistors ($M_{HS}$, $M_{LS}$) of FIG. 1A. For example, the high-side transistor, $M_{HS}$, is ON during a time interval, $\Delta t_{HS}$, when the corresponding gate voltage, $VG_{HS}$, is high. Likewise, the low-side transistor, $M_{LS}$, is ON during a time interval, $\Delta t_{LS}$, when the corresponding gate voltage, $VG_{LS}$, is high. Furthermore, as shown in FIG. 1B, when $VG_{HS}$ is high, since the high-side transistor, $M_{HS}$, is ON, the voltage at the switching node, SW, is high (e.g., substantially equal to $V_{IN}$). On the other hand, when $VG_{LS}$ is low, since the low-side transistor, $M_{LS}$, is ON, the voltage at the switching node, SW, is low (e.g., approximatively at the reference ground level, GND). It should be noted that voltage levels of waveforms shown in FIG. 1B (as well as in other figures of the present disclosure) are not to scale.

With continued reference to FIG. 1B, ON states of the transistors ($M_{HS}$, $M_{LS}$) may be separated by dead-time intervals ($\Delta t_{DLH}$, $\Delta t_{DHL}$), including a (leading edge) dead-time interval, $\Delta t_{DLH}$, that separates the leading edge (i.e., rising edge) of the $VG_{HS}$ (pulse) signal from a preceding $VG_{LS}$ (pulse) signal, and/or a (trailing edge) dead-time interval, $\Delta t_{DHL}$, that separates the trailing edge (i.e., falling edge) of the $VG_{HS}$ (pulse) signal from a succeeding $VG_{LS}$ (pulse) signal. As known to a person skilled in the art, such dead-time intervals ($\Delta t_{DLH}$, $\Delta t_{DHL}$) may be used to eliminate (or reduce) shoot-through current that may be generated when both the transistors ($M_{HS}$, $M_{LS}$) conduct. As known to a person skilled in the art, and shown in FIG. 1B, inductor L coupled to the switching node SW of FIG. 1A, may maintain a current flow (e.g., $I_L$ of FIG. 1B) through the inductor, L, during the dead-time intervals ($\Delta t_{DLH}$, $\Delta t_{DHL}$).

As shown in FIG. 1B, the load current, $I_L$, may be linear by segments (i.e., piecewise linear), including a first linear segment, $I_{LHS}$, during the time interval $\Delta t_{HS}$, and a second linear segment, $I_{LLS}$, during the time interval $\Delta t_{LS}$, the second linear segment, $I_{LLS}$, extending through the dead-time intervals ($\Delta t_{DLH}$, $\Delta t_{DHL}$). As shown in FIG. 1B, the first linear segment, $I_{LHS}$, may be defined by a positive slope (i.e., positive rate of change, positive slew rate), whereas the second linear segment, $I_{LLS}$, may be defined by a negative slope (i.e., negative rate of change, negative slew rate). It should be noted that at least during the time interval $\Delta t_{HS}$, the first linear segment, $I_{LHS}$, shown in FIG. 1B may represent (e.g., equal to) the high-side current $I_{HS}$ through the high-side transistor, $M_{HS}$, of FIG. 1A, and at least during the time interval $\Delta t_{LS}$, the second linear segment, $I_{LLS}$, shown in FIG. 1B may represent (e.g., equal to) the low-side current $I_L$ S through the low-side transistor, $M_{LS}$, of FIG. 1A.

As shown in FIG. 1C, in some implementations of the power converter circuit of FIG. 1A, a shape of the load current, $I_L$, during each of the time intervals $\Delta t_{HS}$ is and $\Delta t_{LS}$ may not be represented by linear segments (i.e., represented by linear functions), rather by curves (e.g., represented by nonlinear functions). As known to a person skilled in the art, shape of the load current, $I_L$, may be based on a rectifying circuit (L, 105) that is coupled to an inverter circuit ($M_{HS}$, $M_{LS}$) of the power converter circuit (e.g., FIG. 1A), the rectifying circuit (L, 105) defined by the combination of the inductor L and the subcircuit (105), and the inverter circuit ($M_{HS}$, $M_{LS}$) defined by the combination of the transistor $M_{HS}$, and the transistor $M_{LS}$. For example, the rectifying circuit (L, 105a) shown in FIG. 1D may produce the piecewise linear load current, $I_L$, according to FIG. 1B, and the rectifying circuit (L, 105b) shown in FIG. 1D may produce a nonlinear load current, $I_L$, according to FIG. 1C (shown in a solid trace).

Figure 1D:
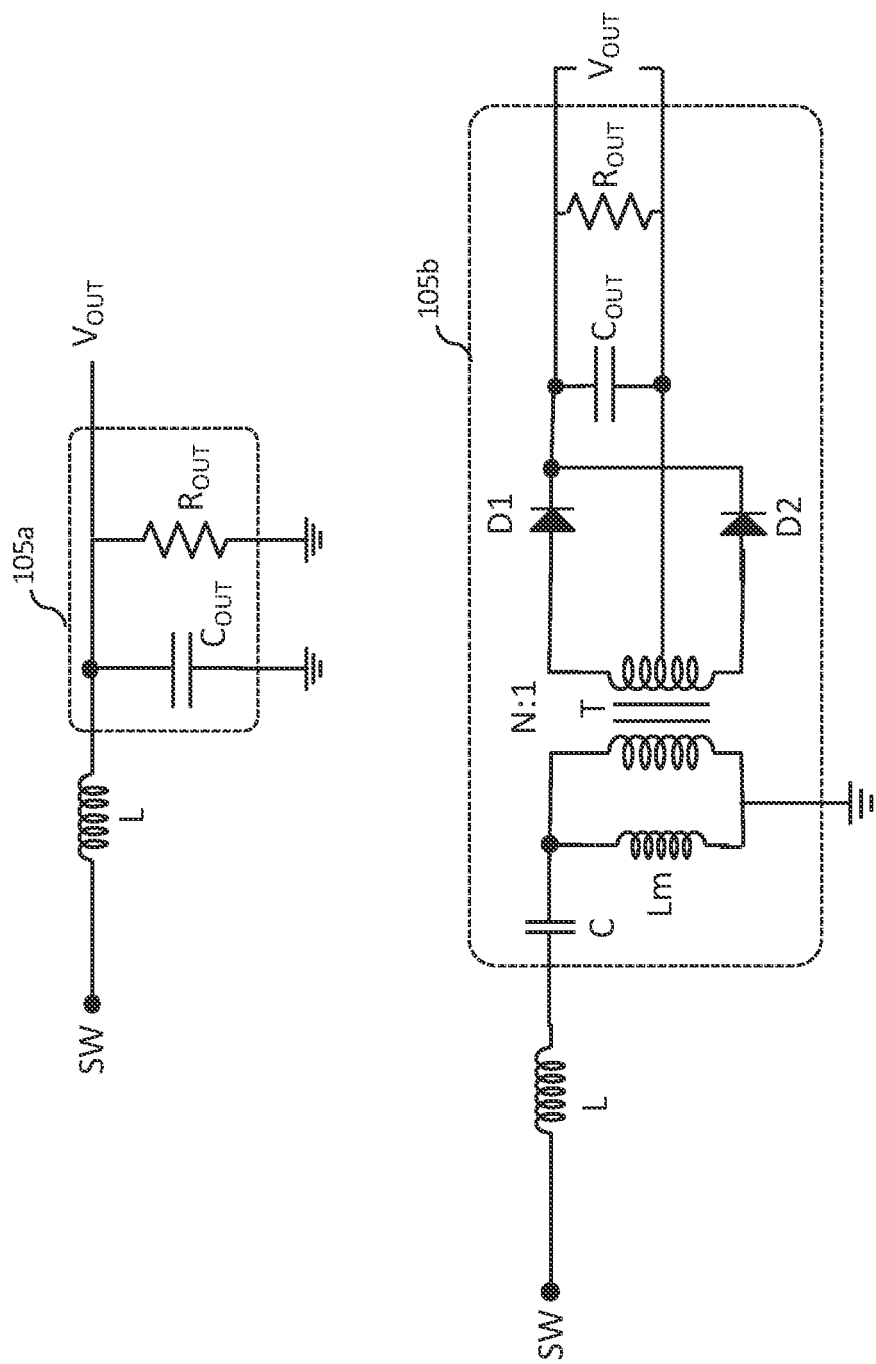
FIG. 1D show two exemplary subcircuits coupled to the power converter circuit of FIG. 1A.

The subcircuit (105a) shown in FIG. 1D comprises a shunted capacitor, $C_{OUT}$, in parallel with a load resistor, $R_{OUT}$, that in combination with the load current, $I_L$, may produce the output (DC) voltage, $V_{OUT}$. On the other hand, the subcircuit (105b) shown in FIG. 1D comprises a capacitor, C, coupled to an inductor, Lm. In the subcircuit (105b), a transformer, T, having a primary to secondary winding ratio of N:1 is used to isolate the power converter circuit (e.g., shown in FIG. 1A) from the output (DC) voltage, $V_{OUT}$. A capacitor $C_{OUT}$ in parallel with a resistor $R_{OUT}$ are coupled to the secondary winding of the transformer through rectifying diodes (D1, D2) to produce the output voltage, $V_{OUT}$. A person skilled in the art would know of many possible subcircuit configurations (e.g., 105 of FIG. 1A) that may be coupled to the power converter circuit shown in FIG. 1A, different configurations which may be used for different design and performance goals. It is noted that teachings according to the present disclosure are not limited to any particular subcircuit configuration and can therefore be used for sensing of load currents, $I_L$, having waveforms according to either FIG. 1B or FIG. 1C or combination thereof. Furthermore, as a load current, $I_L$, may become negative during some portion of time (e.g., time interval wherein $I_{LLS}<0$ in FIG. 1C), current sensing according to the present teachings may include current offset compensation (e.g., FIG. 5 later described) for sensing operation in a positive (or same) current domain.

Figure 2A:
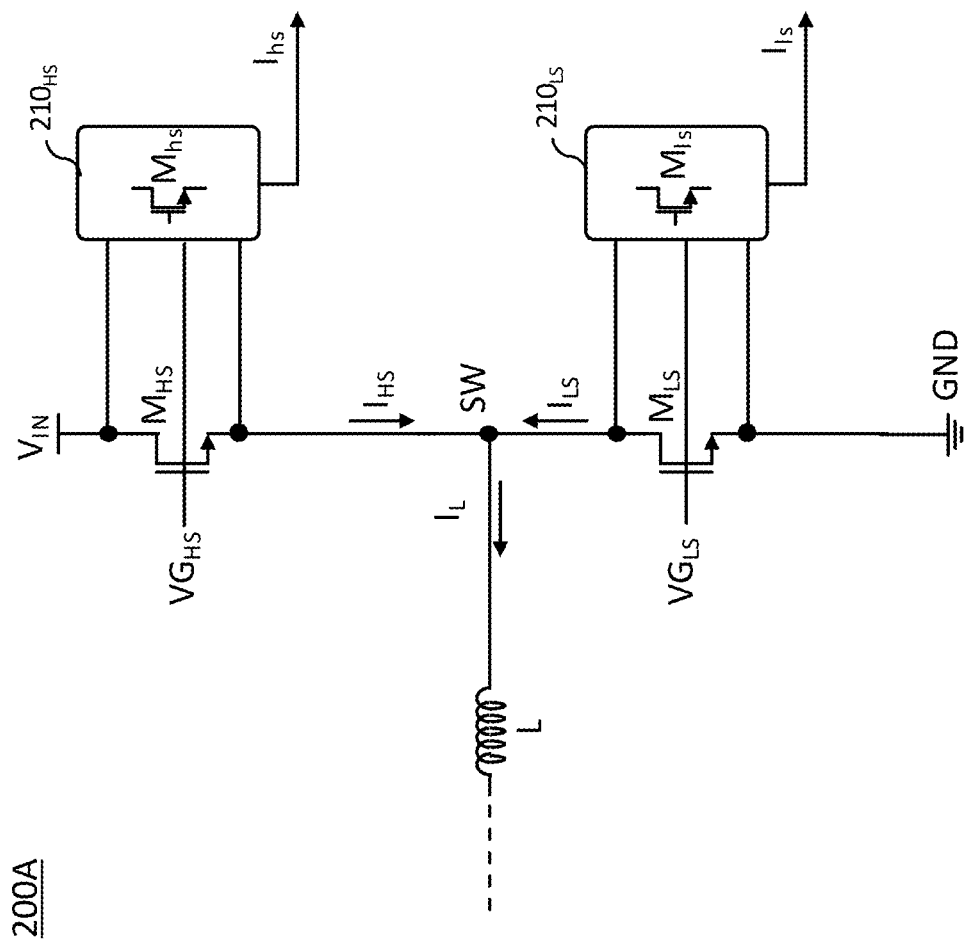
FIG. 2A shows a simplified block diagram comprising current sensing circuits coupled to a power converter circuit according to an embodiment of the present disclosure.

FIG. 2A shows a simplified block diagram (200A) comprising current sensing circuits ($210_{HS}$, $210_{LS}$) according to the present teachings coupled to the power converter circuit described above with reference to FIG. 1A. According to an embodiment of the present disclosure, each of the current sensing circuits ($210_{HS}$) and ($210_{LS}$) may be coupled to a respective one of the transistors $M_{HS}$ and $M_{LS}$. According to an embodiment of the present disclosure, the current sensing circuits ($210_{HS}$) and ($210_{LS}$) may include a respective (high-side) current sensing device, e.g. a transistor $M_{HS}$ and (low-side) current sensing device, e.g. a transistor $M_{LS}$ that may provide respective current conduction paths parallel to current conduction paths of the respective high-side transistor $M_{HS}$ and low-side transistor $M_{LS}$. In other words, the high-side current sensing transistor $M_{HS}$ of the high-side current sensing circuit ($210_{HS}$) may provide a current conduction path that is in a same direction as a current conduction path of the high-side current $I_{HS}$ through the high-side transistor $M_{HS}$, and the low-side current sensing transistor $M_{LS}$ of the low-side current sensing circuit ($210_{LS}$) may provide a current conduction path that is in a same direction as a current conduction path of the low-side current $I_{LS}$ through the low-side transistor $M_{LS}$. Accordingly, by appropriately sizing and biasing of the current sensing transistors $M_{HS}$ and $M_{LS}$, respective high-side and low-side sensing currents Ihs and Ils flowing through the current sensing transistors may be indicative (e.g., proportional) of the currents $I_{HS}$ and $I_{LS}$ flowing through the power converter transistors $M_{HS}$ and $M_{LS}$. It should be noted that although figures and description of the present disclosure may suggest MOSFETs (metal-oxide-semiconductor field-effect transistors), teachings according to the present disclosure may equally apply to other type of transistors, such as, for example, bipolar junction transistors (BJTs) or insulated-gate bipolar transistors (IGBTs).

With continued reference to FIG. 2A, according to an embodiment of the present disclosure, each of the current sensing transistors $M_{HS}$ and $M_{LS}$ may be a reduced size replica (e.g., gate width/length) of the respective transistors $M_{HS}$ and $M_{LS}$. According to an exemplary embodiment of the present disclosure, a ratio of a size of the reduced size replica ($M_{hs}$, $M_{ls}$) to a size of the respective (power) transistor ($M_{HS}$, $M_{LS}$) may be about 1:10,000 or higher (e.g., 1:K with K being greater than 10,000). According to a further embodiment of the present disclosure, at least during a sensing time interval, each of the current sensing transistors $M_{HS}$ and $M_{LS}$ may be biased similarly to the respective transistors $M_{HS}$ and $M_{LS}$. According to yet another embodiment of the present disclosure, at least during a sensing time interval, gate, drain and source voltages to the current sensing transistors $M_{hs}$ and $M_{ls}$ may be the same (e.g., exactly same or very close) to corresponding $M_{HS}$ and $M_{LS}$. By making the current sensing transistors $M_{hs}$ and $M_{ls}$ reduced size replica of the respective transistors $M_{HS}$ and $M_{LS}$, and by biasing the current sensing transistors $M_{hs}$ and $M_{ls}$ similarly/equally to the respective transistors $M_{HS}$ and $M_{LS}$, the high-side and low-side sensing currents Ihs and Ils (e.g., FIG. 2B) flowing through the current sensing transistors may be proportional (e.g., ratiometrically related) to the currents $I_{HS}$ and $I_{LS}$ flowing through the (power converter) transistors $M_{HS}$ and $M_{LS}$. Some exemplary and nonlimiting current sensing circuits (e.g., $210_{HS}$, $210_{LS}$ of FIG. 2A) using replica transistors (e.g., $M_{hs}$, $M_{ls}$ of FIG. 2A) are later described with reference to FIG. 12A and FIG. 12B.

Figure 2B:
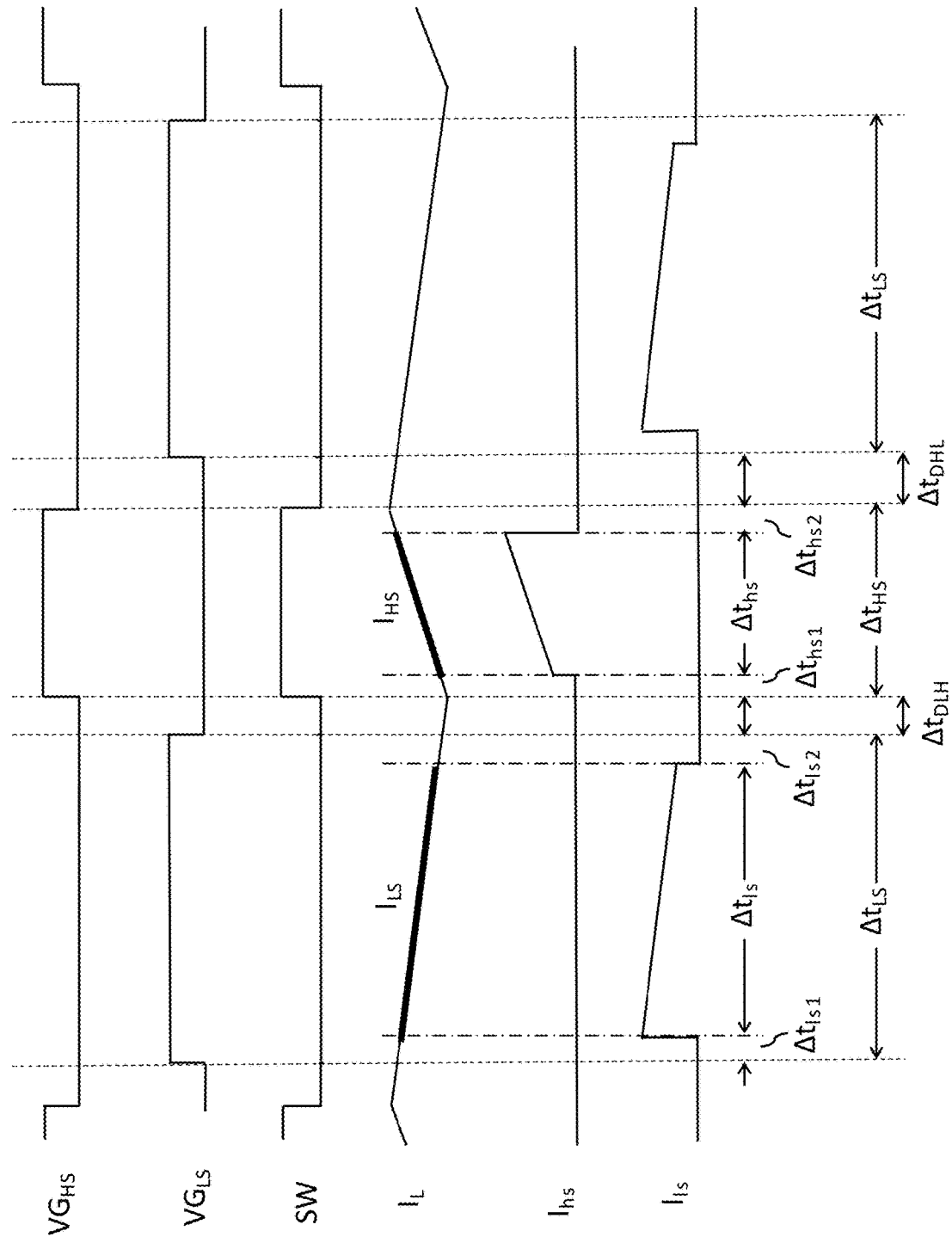
FIG. 2B shows graphs representative of waveforms of signals during operation of the current sensing circuits of FIG. 2A.

FIG. 2B shows graphs representative of waveforms of signals during operation of the current sensing circuits ($210_{HS}$, $210_{LS}$) of FIG. 2A according to an embodiment of the present disclosure. In particular, as shown in FIG. 2B, the current sensing circuits ($210_{HS}$, $210_{LS}$) of FIG. 2A may sense (e.g., output) a low-side current, $I_{ls}$, during a (sensing) time interval $\Delta t_{ls}$, and a high-side current, $I_{hs}$, during a (sensing) time interval $\Delta t_{hs}$. As shown in FIG. 2B, sensing of the currents ($I_{ls}$, $I_{hs}$) may be provided during time intervals ($\Delta t_{ls}$, $\Delta t_{hs}$) where the transistors ($M_{LS}$, $M_{HS}$) are conducting. As shown in FIG. 2B, the time intervals $\Delta t_{ls}$ and $\Delta t_{hs}$ are separate and non-overlapping. According to a further embodiment of the present disclosure, the sensing of the current ($I_{ls}$, $I_{hs}$) may be provided during time intervals that are away (e.g., sufficiently distant) from high voltage switching points/times defined by (positions of) rising or falling transitions of the gate voltages ($VG_{HS}$, $VG_{LS}$) and/or of the switching node SW voltage. Accordingly, as shown in FIG. 2B, the high-side sensing time interval, $\Delta t_{hs}$, may be fully encompassed within the time interval, $\Delta t_{HS}$, and away/distanced from the rising and falling transitions of the gate voltage, $VG_{HS}$, by respective (non-zero) blanking time intervals $\Delta t_{hs1}$ and $\Delta t_{hs2}$. Accordingly, as can be seen in FIG. 2B, $\Delta t_{HS} = \Delta t_{hs1} + \Delta t_{hs} + \Delta t_{hs2}$, with $\Delta t_{hs1} \neq 0$ and $\Delta t_{hs2} \neq 0$, or in other words, and as used herein, the high-side sensing time interval, $\Delta t_{hs}$, may be "strictly" contained within the time interval, $\Delta t_{HS}$. Similarly, and as shown in FIG. 2B, blanking time intervals $\Delta t_{ls1}$ and $\Delta t_{ls2}$ may be provided for the low-side sensing time interval, $\Delta t_{ls}$, such that $\Delta t_{LS} = \Delta t_{ls1} + \Delta t_{ls} + \Delta t_{ls2}$, with $\Delta t_{ls1} \neq 0$ and $\Delta t_{ls2} \neq 0$. Accordingly, the low-side sensing time interval, $\Delta t_{ls}$, may be strictly contained within the time interval, $\Delta t_{LS}$. It should be noted that teachings according to the present disclosure may not be limited to current sensing via blanking time intervals. As later described with reference to FIG. 11A/11B, the teachings according to the present disclosure may allow current sensing without blanking time intervals.

With continued reference to FIG. 2B, the sensed currents ($I_{ls}$, $I_{hs}$) may represent currents ($I_{LS}$, $I_{HS}$) through the transistors ($M_{LS}$, $M_{HS}$) only during the sensing time intervals ($\Delta t_{ls}$, $\Delta t_{hs}$). As shown in FIG. 2B, outside the sensing time intervals ($\Delta t_{ls}$, $\Delta t_{hs}$), currents output by the current sensing circuits according to the present disclosure (e.g., $210_{HS}$, $210_{LS}$ of FIG. 2A) may be constant and set to, for example, zero. Accordingly, combining (e.g., summing) such two sensed currents, as shown in FIG. 2C, may result in a combined sensed current ($I_{hs} + I_{ls}$) that may be considered "discontinuous" by virtue of its large instantaneous current transitions/deviations at the (vicinity of the) start/end of the sensing time intervals ($\Delta t_{ls}$, $\Delta t_{hs}$).

Teachings according to the present disclosure may allow reduction, or complete removal of such large instantaneous current transition/deviations by bridging the low-side and high-side sensed currents with (bridging) current values/segments that are emulated/synthesized from the sensed currents. As will be described below in the present disclosure, such (bridging) current values/segments may be emulated based on sensed current values, and/or on sensed current slopes (rate of change, slew rate), at the transition points of the sensing time intervals (e.g., $\Delta t_{ls}$, $\Delta t_{hs}$ of FIG. 2B). Accordingly, the sensed current provided by the circuits and methods according to the present disclosure may be a continuous current with higher fidelity with respect to the (actual) load current, $I_L$. Furthermore, as later described with reference to FIG. 11A/11B, in some cases, including in cases where current sensing is provided without blanking time intervals, the large instantaneous current transitions/deviations may be removed by filtering circuits.

Figure 3:
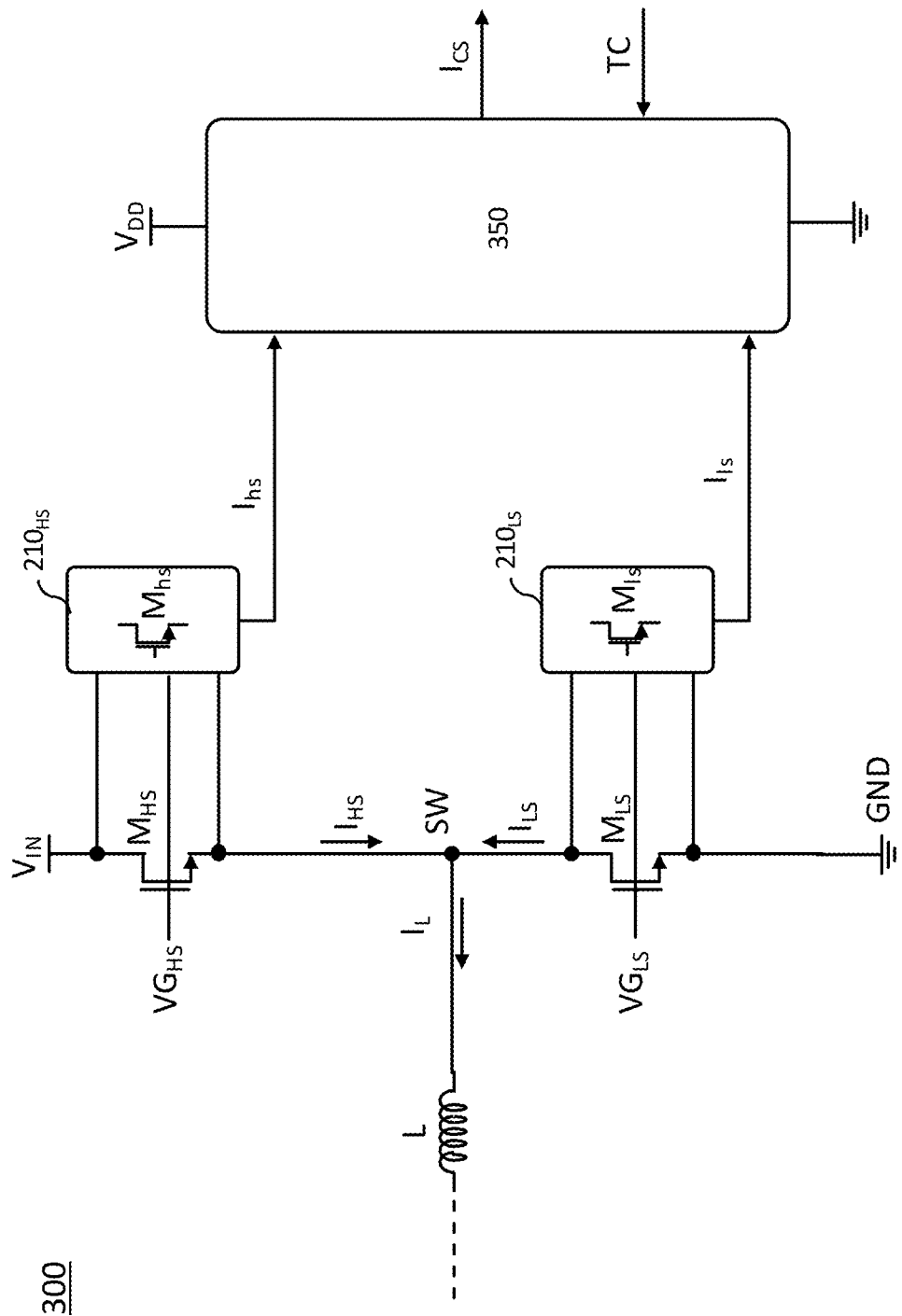
FIG. 3 shows a simplified block diagram comprising a continuous current sensing circuit coupled to a power converter circuit according to an embodiment of the present disclosure.

FIG. 3 shows a simplified block diagram (300) comprising a continuous current sensing circuit ($210_{HS}$, $210_{LS}$, 350) coupled to a power converter circuit according to an embodiment of the present disclosure. In addition to the current sensing circuits ($210_{HS}$, $210_{LS}$) described above with reference to FIG. 2A, the continuous current sensing circuit ($210_{HS}$, $210_{HS}$, 350) may further include a current combiner circuit (350) that is configured to combine the sensed currents ($I_{hs}$, $I_{ls}$) to generate a continuous sensing current, $I_{CS}$. According to some embodiments of the present disclosure, the current combiner circuit (350) may include current bridging functionality that is configured to bridge the sensed currents ($I_{hs}$, $I_{ls}$) with emulated/bridging currents as described above. According to further embodiments of the present disclosure, the current combiner circuit (350) may include filtering functionality that is configured to remove (effects of) large instantaneous current transitions/deviations in the sensed currents ($I_{hs}$, $I_{ls}$). It should be noted that the current bridging and filtering functionalities may be used as standalone or in combination within the current combiner circuit (350). In other words, the current combiner circuit (350) may include any one or both of the two functionalities. In the following description, embodiments that include the current bridging functionality are first described (e.g., with reference to FIGS. 4-10), followed by embodiments that do not (necessarily) include the current bridging functionality (e.g., with reference to FIG. 11). Furthermore, some exemplary embodiments of the current sensing circuits (e.g., $210_{HS}$, $210_{LS}$ of FIG. 2A and FIG. 3) will be described with reference to FIG. 12.

With continued reference to FIG. 3, operation of the continuous current sensing circuit ($210_{HS}$, $210_{HS}$, 350), including synchronization with events/transitions/timing governing operation of the power converter circuit (including the power transistors $M_{HS}$ and M L s), may be based on timing (control) information, TC, provided to the current combiner (and bridging) circuit (350). Although not shown in FIG. 3, according to some exemplary embodiments, entirety or a subset of the timing information, TC, may also be provided to the current sensing circuits ($210_{HS}$, $210_{LS}$). The timing information, TC, may be provided by, or based on, the timing control and drive circuit block (102) described above with reference to FIG. 1A. It should be noted that although the circuit block (102) is shown in FIG. 1A as a single functional block encompassing functionalities of, for example, timing control (e.g., generation of timing information) and drive (e.g., generation of gate drives at appropriate voltage levels), such functionalities may be implemented in different/separate circuit blocks operating from different supply voltages.

Figure 4A:
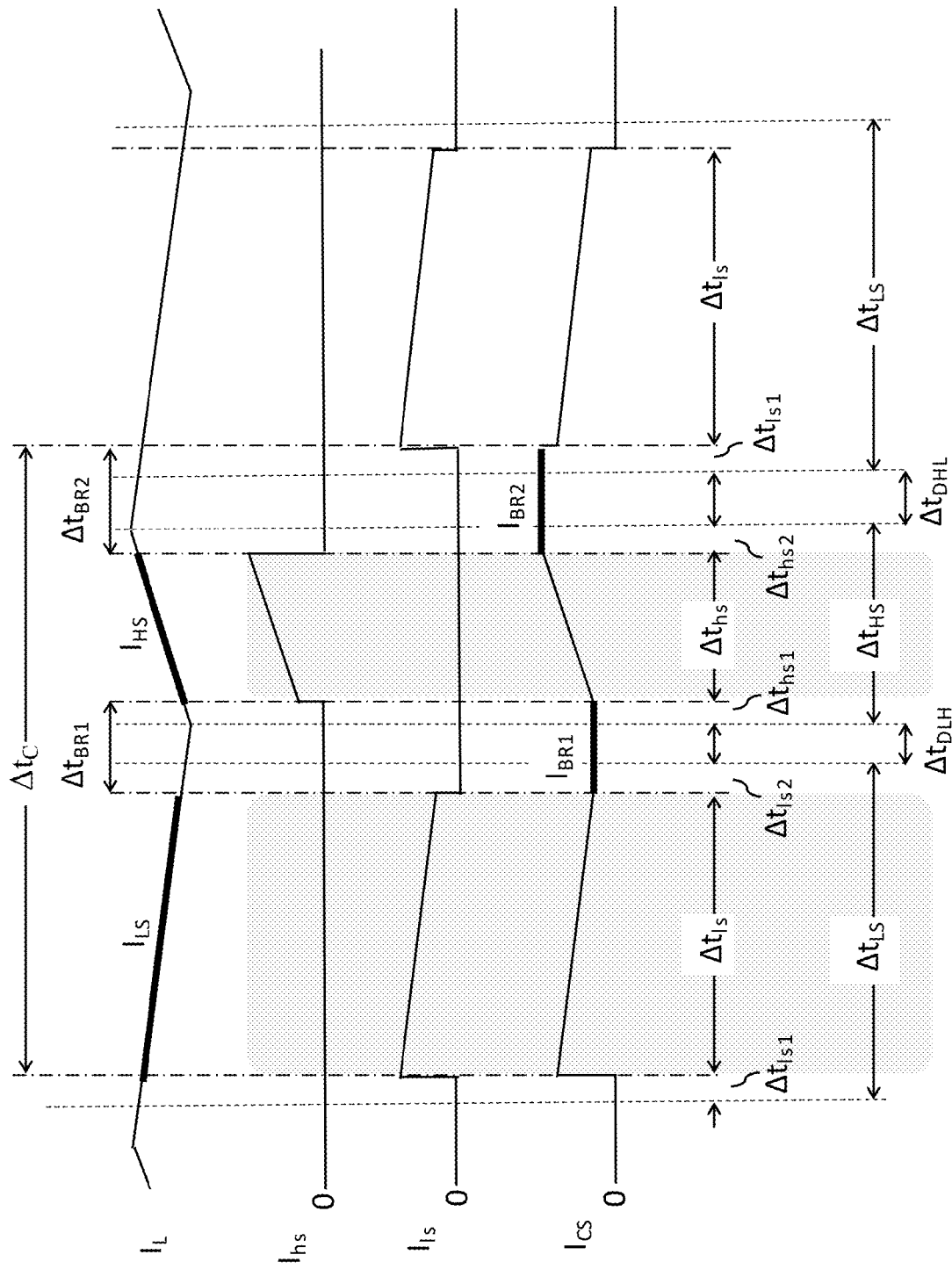
FIG. 4A shows graphs representative of waveforms of signals during operation of the continuous current sensing circuit of FIG. 3, including bridging of sensed currents.

FIG. 4A shows graphs representative of waveforms of (current) signals during operation of the continuous current sensing circuit ($210_{HS}$, $210_{LS}$, 350) of FIG. 3, including bridging of sensed currents ($I_{hs}$, $I_{ls}$). Graphs shown in FIG. 4A should be read in light of the above provided description with reference to FIGS. 1B-1C and FIGS. 2B-2C. In particular, the graphs of FIG. 4A show construction of the continuous sensing current, $I_{CS}$, by the continuous current sensing circuit ($210_{HS}$, $210_{HS}$, 350) based on a combination/bridging of the sensed currents ($I_{hs}$, $I_{ls}$) with emulated/bridging currents ($I_{BR1}$, $I_{BR2}$). For example, the emulated/bridging current, $I_{BR1}$, may correspond to a (fixed) current value of the low-side current, $I_{ls}$, that is sensed at the end of the (sensing) time interval $\Delta t_{ls}$, and the emulated/bridging current, $I_{BR2}$, may correspond to a (fixed) current value of the high-side current, $I_{hs}$, that is sensed at the end of the (sensing) time interval $\Delta t_{hs}$. In other words, according to an embodiment of the present disclosure, the current combiner circuit (350 of FIG. 3) may hold the sensed end-value of the low-side current (i.e., sensed at the end of $\Delta t_{ls}$) and generate therefrom a fixed-value bridging current, $I_{BR1}$, during the (bridging) time interval (i.e., $\Delta t_{BR1} = \Delta t_{ls2} + \Delta t_{DLH} + \Delta t_{hs1}$) that leads to the start of the high-side current sensing (i.e., start of $\Delta t_{hs}$). As shown in FIG. 4A, same/similar bridging mechanism may be used to generate, based on the sensed end-value of the high-side current (i.e., sensed at the end of $\Delta t_{hs}$), the fixed-value bridging current, $I_{BR2}$, during the (bridging) time interval $\Delta t_{BR2}$ (i.e., $\Delta t_{BR2}=\Delta t_{hs2}+\Delta t_{DHL}+\Delta t_{ls1}$).

Figure 4B:
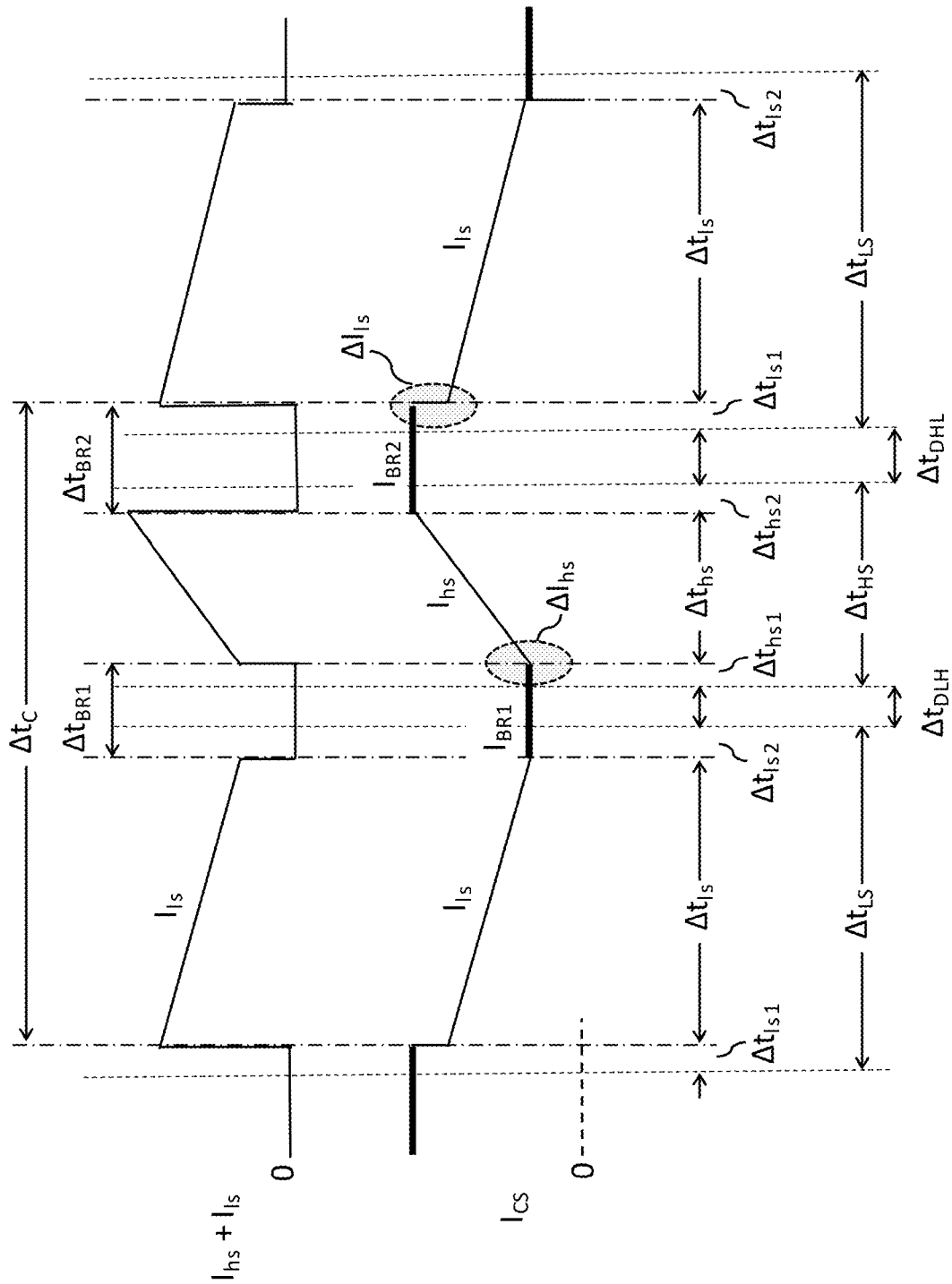
FIG. 4B shows a discontinuity in a current sensed by the continuous current sensing circuit of FIG. 3.

Since the bridging currents (e.g., $I_{BR1}$, $I_{BR2}$ of FIG. 4A) may be current segments with zero slope, there may be discontinuity in current values (e.g., magnitudes) at the bridging endpoints defined by the transitions from the bridging currents to the sensed currents. Such discontinuity in currents is shown in FIG. 4B in terms of differences (e.g., $\Delta I_{hs}$ and $\Delta I_{ls}$) between the bridging currents (e.g., $I_{BR1}$ and $I_{BR2}$) and the sensed currents (e.g., $I_{hs}$ and $I_{ls}$) at the end of the corresponding bridging time intervals (e.g., $\Delta t_{BR1}$ and $\Delta t_{BR2}$). In the exemplary case shown in FIG. 4B, the discontinuity, $\Delta I_{hs}$, between the bridging current, $I_{BR1}$, and the sensing current, $I_{hs}$ may be regarded as negligible, whereas the discontinuity, $\Delta I_{ls}$, between the bridging current, $I_{BR2}$, and the sensing current, $I_{ls}$, may be regarded as substantial. Teachings according to the present disclosure may remove or otherwise reduce such discontinuities to levels regarded as negligible via signal filtering. This is shown in FIG. 4C.

Figure 4C:
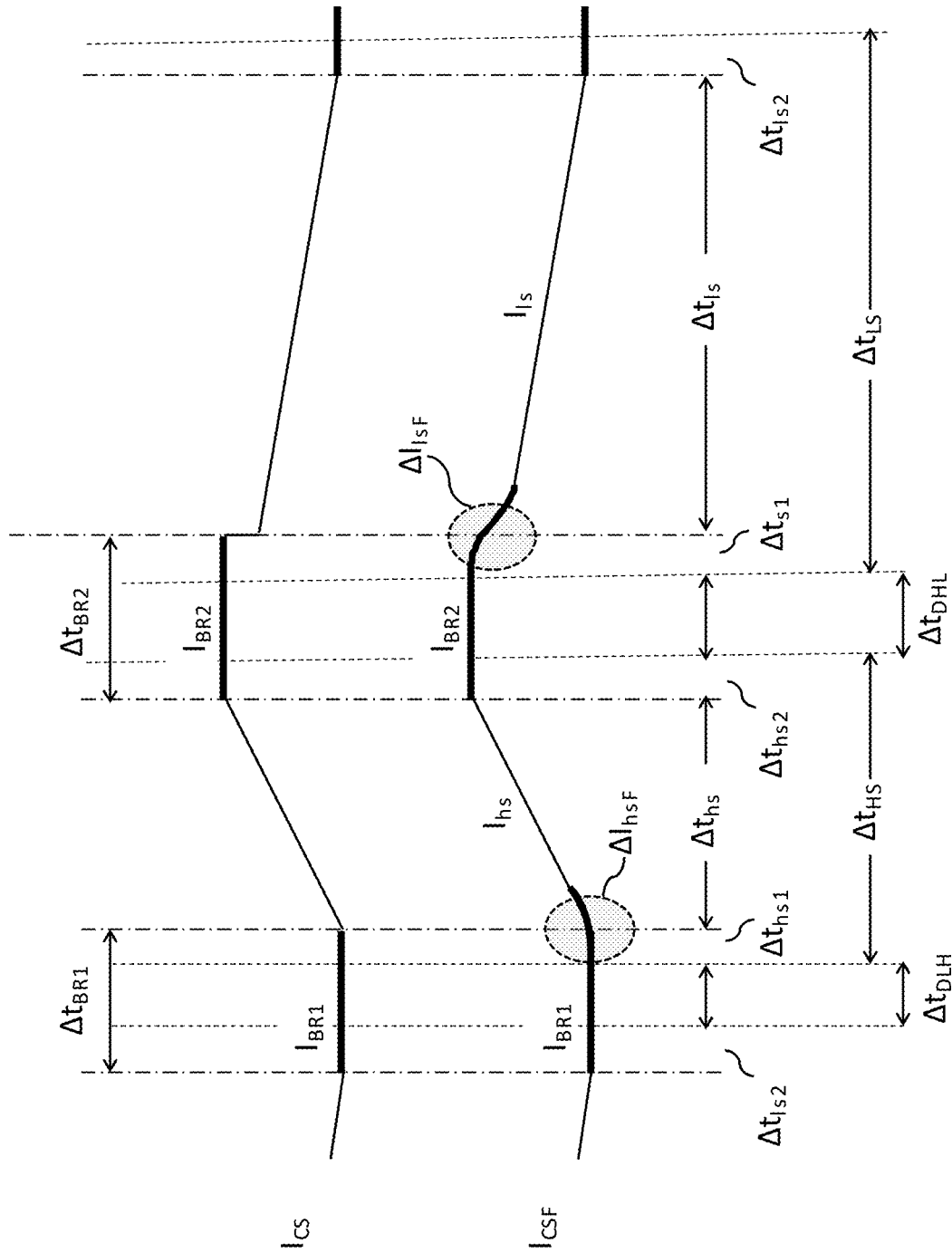
FIG. 4C shows graphs representative of waveforms of signals during operation of the continuous current sensing circuit of FIG. 3 with added filtering for removal of the discontinuity shown in FIG. 4B.

As shown in FIG. 4C, the applied filtering to the unfiltered current (e.g., $I_{CS}$, top of FIG. 4C) smoothens the transition from the bridging currents (e.g., $I_{BR1}$, $I_{BR2}$) to the sensed currents (e.g., $I_{hs}$, $I_{ls}$) to provide the filtered current, $I_{CSF}$ (bottom of FIG. 4C). As will be described later in the present disclosure with reference to, for example, FIG. 11A/11B, according to some embodiments of the present disclosure, filtering without bridging may be sufficient for combining the sensed currents (e.g., $I_{hs}$ and $I_{ls}$) and generating therefrom a smooth and continuous sensed current. In other words, teachings according to the present disclosure may allow flexibility in choice of a functionality (e.g., bridging and/or filtering) provided by the combiner circuit to achieve desired goals and performances. Furthermore, as will be described later in the present disclosure (e.g., FIGS. 6-9), generation of the continuous sensed current, (e.g., $I_{CS}$ or $I_{CSF}$) by the current combiner circuit (e.g., 350 of FIG. 3) may include operation via circuit blocks that include functionalities of, for example, current-to-voltage conversion, voltage-to-current conversion, sample and hold, (lowpass) filtering, current summation and/or subtraction, current amplification and/or mirroring, and voltage or current switching.

Figure 5:
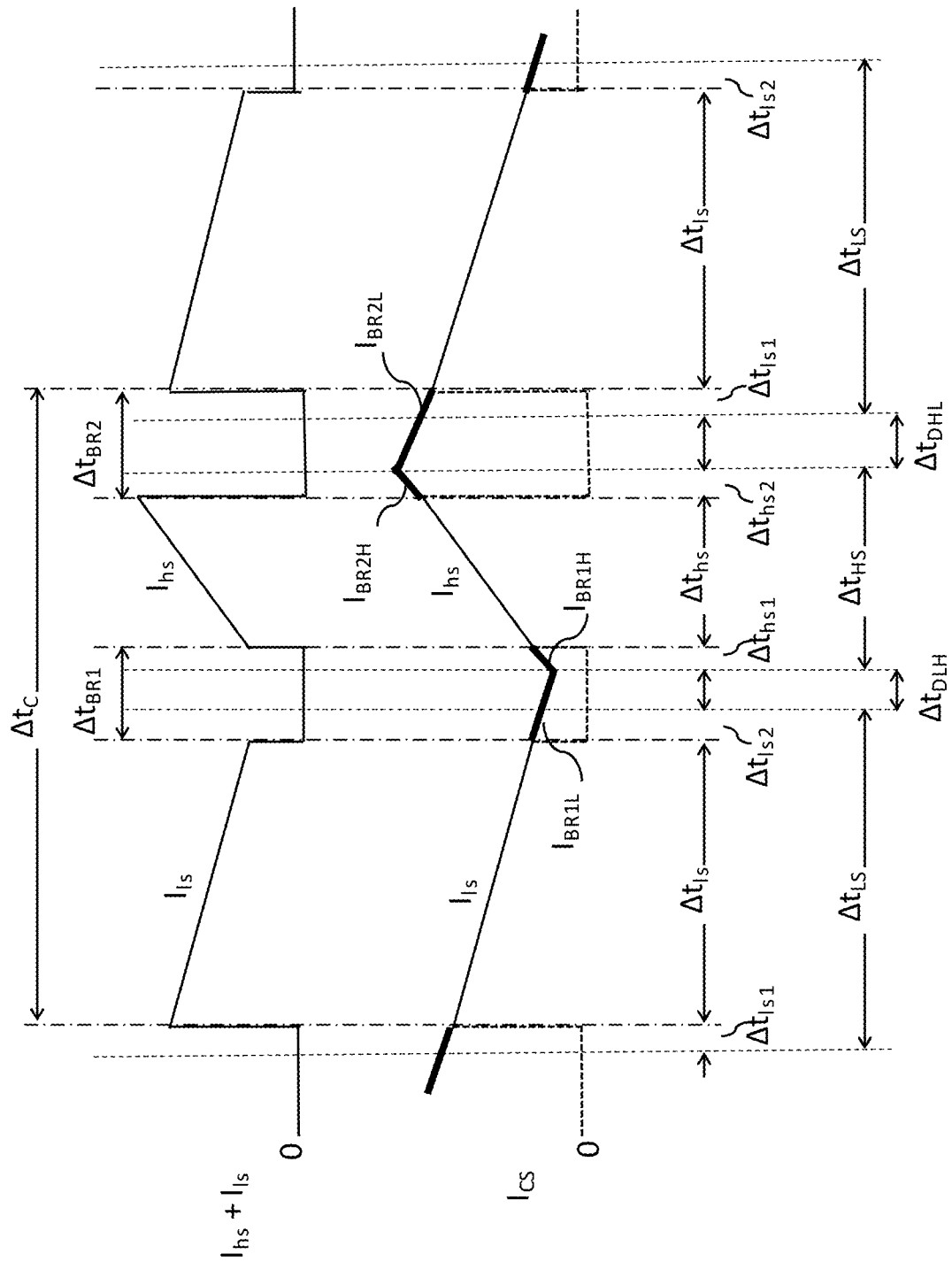
FIG. 5 shows graphs representative of waveforms of signals during operation of the continuous current sensing circuit of FIG. 3, including bridging of sensed currents with slope emulation.

According to an embodiment of the present disclosure, bridging of the sensed currents (e.g., $I_{hs}$ and $I_{ls}$) may include not only bridging based on the sensed end-value currents leading to the transition points (e.g., bridging start-points), but also based on slopes (e.g., slew rate) of the sensed currents leading to the transition points. Graphs representative of waveforms of signals during operation of the continuous current sensing circuit ($210_{HS}$, $210_{LS}$, 350) of FIG. 3, including bridging of sensed currents with slope emulation, are shown in FIG. 5. As shown in FIG. 5, bridging of the sensed low-side current, $I_{ls}$, to the sensed high-side current, $I_{hs}$, may be provided via a segmented bridging current that includes: a first segment, $I_{BR1L}$, having a slope that is based on a slope of the sensed low-side current, $I_{ls}$, at the vicinity of the transition point (e.g., between $\Delta t_{ls}$ and $\Delta t_{BR1}$, bridging start-point) between the (sensing) time interval $\Delta t_{ls}$ and the bridging time interval $\Delta t_{BR1}$; and a second segment, $I_{BR1H}$, having a slope that is based on a slope of the sensed high-side current, $I_{hs}$, at the vicinity of the transition point (e.g., between $\Delta t_{BR1}$ and $\Delta t_{hs}$, bridging end-point) between the bridging time interval $\Delta t_{BR1}$ and the (sensing) time interval $\Delta t_{hs}$. As shown in FIG. 5, a similar segmented bridging current (e.g., $I_{BR2H}$, $I_{BR2L}$) may be generated for bridging of the sensed high-side current, $I_{hs}$, to the sensed low-side current, $I_{ls}$.

With continued reference to FIG. 5, due to the periodic (e.g., repetitive) nature of the sensing, slope detection/sensing/emulation/derivation may be based on average and/or instantaneous slope values gathered during previous or current sensing time intervals. For example, with reference to the segmented bridging current ($I_{BR1L}$, $I_{BR1H}$) of FIG. 5, the slope of the first bridging segment, $I_{BR1L}$, may be derived from the low-side current, $I_{ls}$, sensed within the low-side sensing time interval $\Delta t_{ls}$ that is immediately before (e.g., adjacent) the bridging time interval, $\Delta t_{BR1}$, or sensed within prior one or more low-side sensing time intervals (e.g., $\Delta t_{ls}$ not shown in FIG. 5). On the other hand, the slope of the second bridging segment, $I_{BR1H}$, may be derived from the high-side current, $I_{hs}$, sensed within prior one or more high-side sensing time intervals (e.g., $\Delta t_{hs}$ not shown in FIG. 5).

Figure 6:
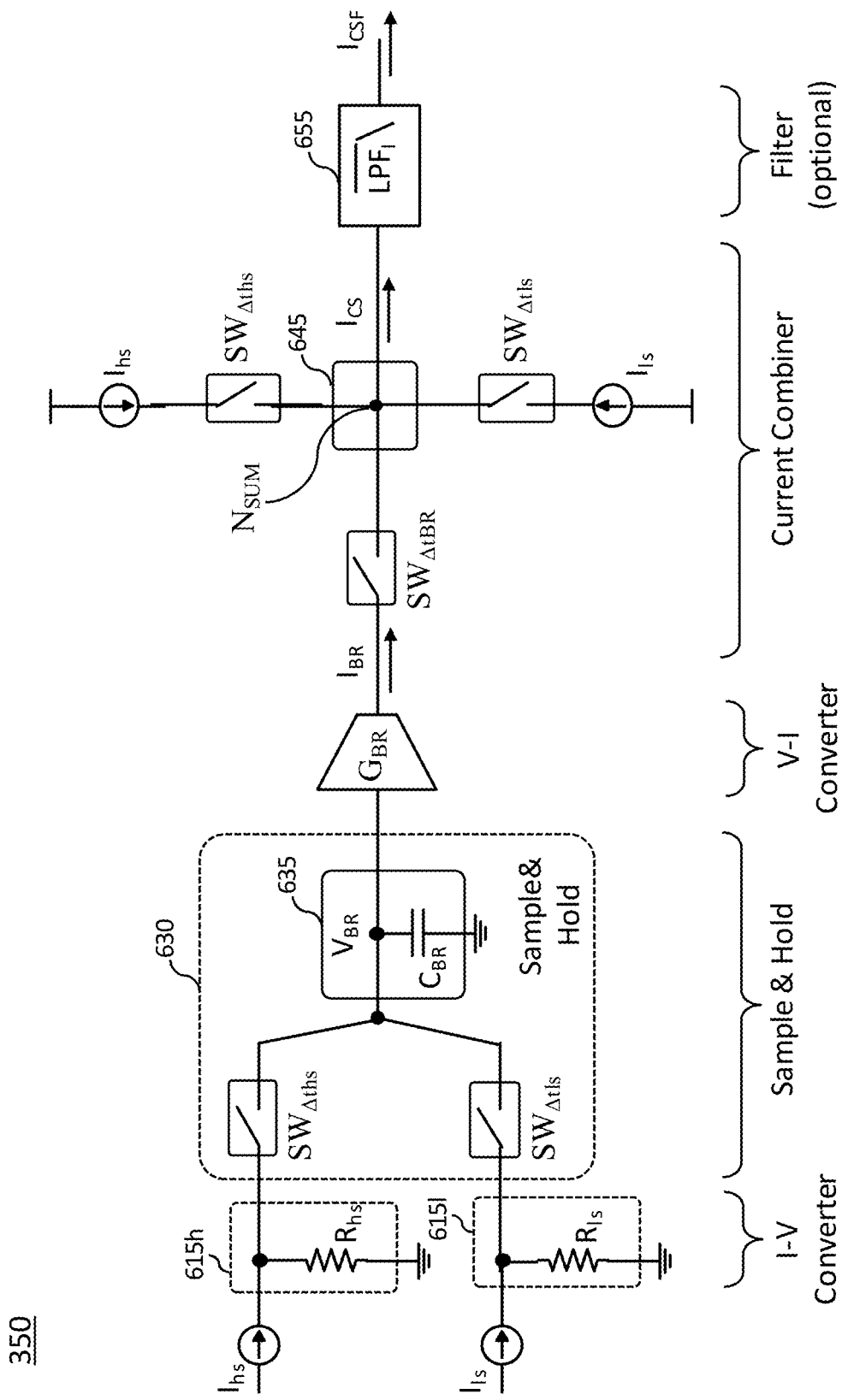
FIG. 6 shows a simplified block diagram of a current combiner and bridging circuit according to an embodiment of the present disclosure.

FIG. 6 shows a simplified block diagram of a current combiner (and bridging) circuit (e.g., 350 of FIG. 3) according to an embodiment of the present disclosure. Such bridging circuit may be used to generate the continuous sensing current, $I_{CS}$, and/or $I_{CSF}$, described above with reference to, for example, FIGS. 4A-4C. As shown in FIG. 6, the current combiner (and bridging) circuit (350) may include: circuit blocks (615$l$, 615$h$) for current-to-voltage conversion of the sensed low/high-side current ($I_{ls}$, $I_{hs}$) via resistors ($R_{ls}$, $R_{hs}$); circuit block (630) for sample and hold (e.g., via block 635) of the voltage-converted sensed low/high-side current ($I_{ls}$, $I_{hs}$) at appropriate times based on ON states of switches $SW_{\Delta TLS}$ and $SW_{\Delta THS}$; a transconductance amplifier, $G_{BR}$, for voltage-to-current conversion of the sampled and held values; a current combiner circuit block (labeled Current Combiner in FIG. 6) that selectively combines/routes (e.g., via switches $SW_{\Delta Ths}$, $SW_{\Delta Tls}$, $SW_{\Delta TBR}$) one of three currents (e.g., $I_{ls}$, $I_{hs}$, $I_{BR}$) to an output node, $N_{SUM}$, for output/generation of the continuous sensing current, $I_{CS}$; and an optional (lowpass) filter (655) for filtering (e.g., smoothening) of the current, $I_{CS}$, and output of the filtered (smoothened) current $I_{CSF}$. A person skilled in the art would realize that circuit blocks (615$l$, 615$h$, 630, $G_{BR}$) may be used for generation of the bridging current, $I_{BR}$, based on the sensed currents ($I_{ls}$, $I_{hs}$), and circuit blocks ($SW_{\Delta Tls}$, $SW_{\Delta Ths}$, $SW_{\Delta TBR}$, 645) may be used for combining of the three currents ($I_{ls}$, $I_{hs}$, $I_{BR}$) into the current, $I_{CS}$.

It should be noted that the lower-case suffixes used in the reference designators to the switches shown in FIG. 6 indicate (possible) time intervals (e.g., described with reference to FIGS. 4A-4C) during which the switches may be ON (e.g., closed, conducting, activated, etc.). For example, during the time interval $\Delta t_{ls}$, the switch $SW_{\Delta Tls}$ is ON and therefore the circuit block (630) may sample the sensed low-side current, $I_{ls}$, for later generation/emulation of the (fixed-value) bridging current, $I_{BR}$, (e.g., $I_{BR1}$ of FIGS. 4A-4C). In turn, during the time interval $\Delta t_{BR1}$, the switch $SW_{\Delta TBR}$ of the current combiner circuit block may be ON for (actual) generation/emulation of the bridging current, $I_{BR}$, (e.g., $I_{BR1}$ of FIGS. 4A-4C) that is routed to the output node, $N_{SUM}$, for output as (part of) the continuous sensing current, $I_{CS}$. Similar operation may be provided via ON states of the switches ($SW_{\Delta Ths}$, $SW_{\Delta TBR}$) during the time intervals ($\Delta t_{hs}$, $\Delta t_{BR2}$) described above with reference to FIGS. 4A-4C. Furthermore, during the sensing time intervals (e.g., $\Delta t_{ls}$, $\Delta t_{hs}$ of FIGS. 4A-4C), the switches ($SW_{\Delta Tls}$, $SW_{\Delta Ths}$) are ON so that the respective sensed currents ($I_{ls}$, $I_{hs}$) are routed to the output node, $N_{SUM}$, for output as (part of) the continuous sensing current, $I_{CS}$. Optional filtering via filter (655) may be applied to the continuous sensing current, $I_{CS}$, to generate to the filtered/smoothened current, $I_{CSF}$.

Figure 7A:
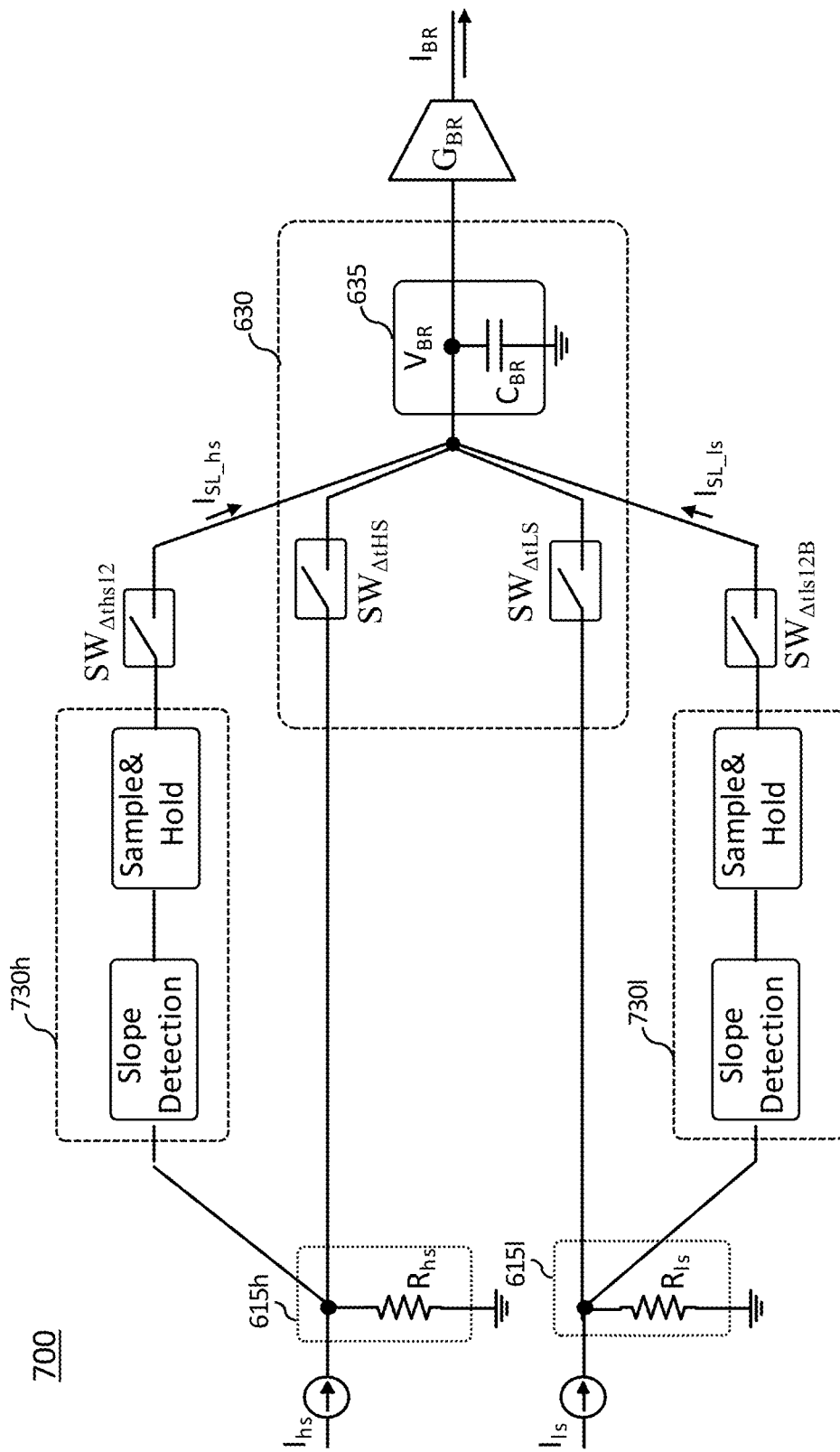
FIG. 7A shows a simplified block diagram of a bridge current generation circuit block with slope detection and emulation according to an embodiment of the present disclosure.

FIG. 7A shows a simplified block diagram of a bridge current generation circuit block (700) according to an embodiment of the present disclosure which may be used to generate, based on the sensed low/high-side currents ($I_{ls}$, $I_{hs}$), a (segmented) bridging current with slope emulation according to the description above with reference to, for example, FIG. 5. As can be seen in FIG. 7A, the circuit block (700) is based on the circuit blocks (615$l$, 615$h$, 630, $G_{BR}$) described above with reference to FIG. 6, with the addition of the circuit blocks (730$l$, 730$h$) that are configured to detect/measure slopes (slew rates) of the sensed low/high-side currents ($I_{ls}$, $I_{hs}$). In turn, when combined with current values of the sensed low/high-side currents ($I_{ls}$, $I_{hs}$) at the transition points (e.g., via circuit blocks 615$l$, 615$h$, 630, $G_{BR}$), the circuit block (700) may generate the segmented bridging currents ($I_{BR1L}$, $I_{BR1H}$) and ($I_{BR2H}$, $I_{BR2L}$) shown in FIG. 5. For example, based on the sensed low-side current, $I_{ls}$, via the circuit block (615$l$), the circuit block (730$l$) may detect/measure a corresponding slope (e.g., via Slope Rate Detection circuit block of FIG. 7A) and store/register a corresponding slope value (e.g., via Sample&Hold circuit block) for later generation as a slope current (e.g., $I_{SL\_ls}$, $I_{SL\_hs}$) that when combined at the node, $V_{BR}$, charges or discharges the capacitor, $C_{BR}$, thereby generating/emulating the slope of the segmented bridging current, $I_{BR}$ (e.g., $I_{BR1L}$, $I_{BR1H}$ of FIG. 5). As shown in FIG. 7A, use of the stored slope values (e.g., via respective Sample&Hold circuit blocks) for generation of bridging currents may be selective and based on ON states of the switches $SW_{\Delta tls12B}$ (for low-side slope emulation) and $SW_{\Delta ths12}$ (for high-side slope emulation). In particular, the switch $SW_{\Delta tls12B}$ may be ON during the time intervals ($\Delta t_{ls1}$, $\Delta t_{ls2}$, $\Delta t_{DLH}$, $\Delta t_{DHL}$) of FIG. 5 for generation of (sloped) current segments $I_{BR1L}$ and $I_{BR2L}$ of FIG. 5, and the switch $SW_{\Delta ths12}$ may be ON during the time intervals ($\Delta t_{hs1}$, $\Delta t_{hs2}$) of FIG. 5 for generation of (sloped) current segments $I_{BR1H}$ and $I_{BR2H}$ of FIG. 5.

Figure 7B:
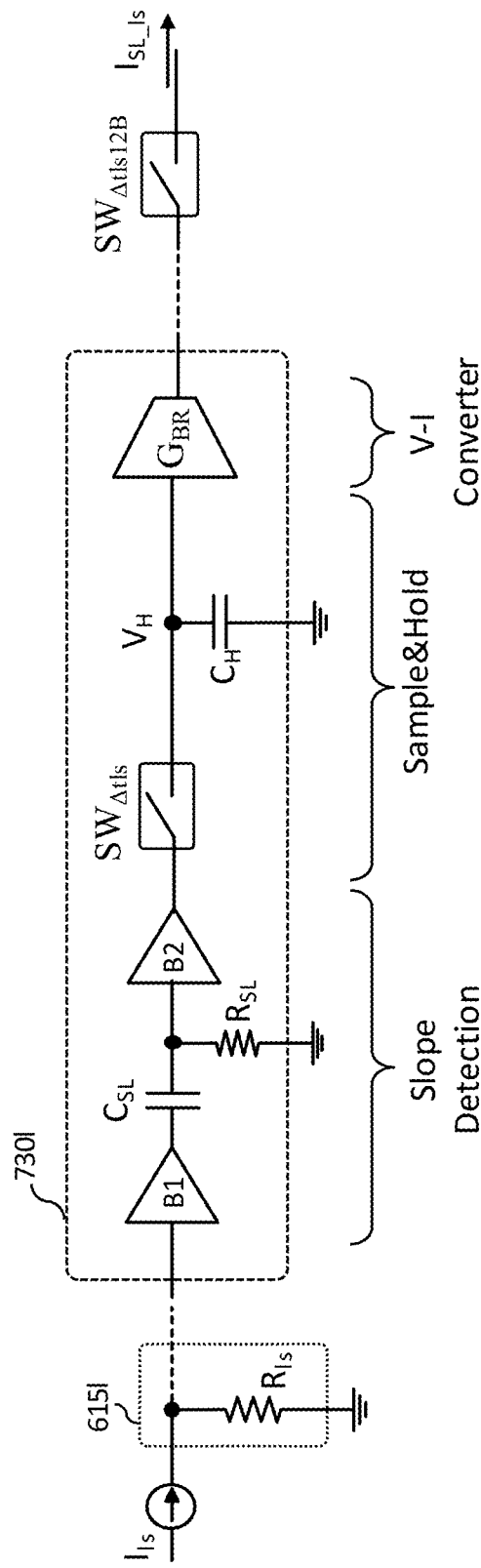
FIG. 7B shows a simplified schematic of a slope detection and emulation circuit according to an embodiment of the present disclosure.

FIG. 7B shows a simplified schematic of a slope (e.g., slew rate) detection and emulation circuit (730) according to an embodiment of the present disclosure that may be used as circuit blocks (730$l$) or (730$h$) described above with reference to FIG. 7A. As shown in FIG. 7B the circuit (730) includes slope detection functionality (Slope Detection), followed by sample and hold functionality (Sample&Hold), followed by voltage-to-current conversion functionality (V-I Converter). In particular, when used as the circuit block (730$l$) of FIG. 7A, after the sensed current (e.g., $I_{ls}$) is converted to a corresponding sensed voltage via the circuit block (615$l$), the slope detection circuit (B1, $C_{SL}$, $R_{SL}$, B2) first buffers the sensed voltage via buffer, B1, then generates the differential (rate of change with respect to time, and therefore the slope) of the sensed voltage via (series) capacitor, $C_{SL}$, and shunted resistor, $R_{SL}$, and presents a buffered version of the slope, via buffer, B2, to the sample and hold circuit (Sample&Hold). In turn, the sample and hold circuit samples a voltage representative of the slope via a switch, $SW_{\Delta Tls}$, that is ON during the sensing time interval (e.g., low-side sensing time interval, $\Delta tls$) and stores/registers the sampled voltage at a charging node, $V_H$, via a (holding) capacitor, $C_H$, coupled to the charging node, $V_H$. Finally, a transconductance amplifier, $G_{BR}$, may be used to convert the sampled voltage to a current that in turn will be used to generate and represent the detected slope for (later) output as a segment (e.g., $I_{BR1L}$, $I_{BR2L}$, of FIG. 5) of the (sloped) bridging current shown in FIG. 5.

Figure 8A:
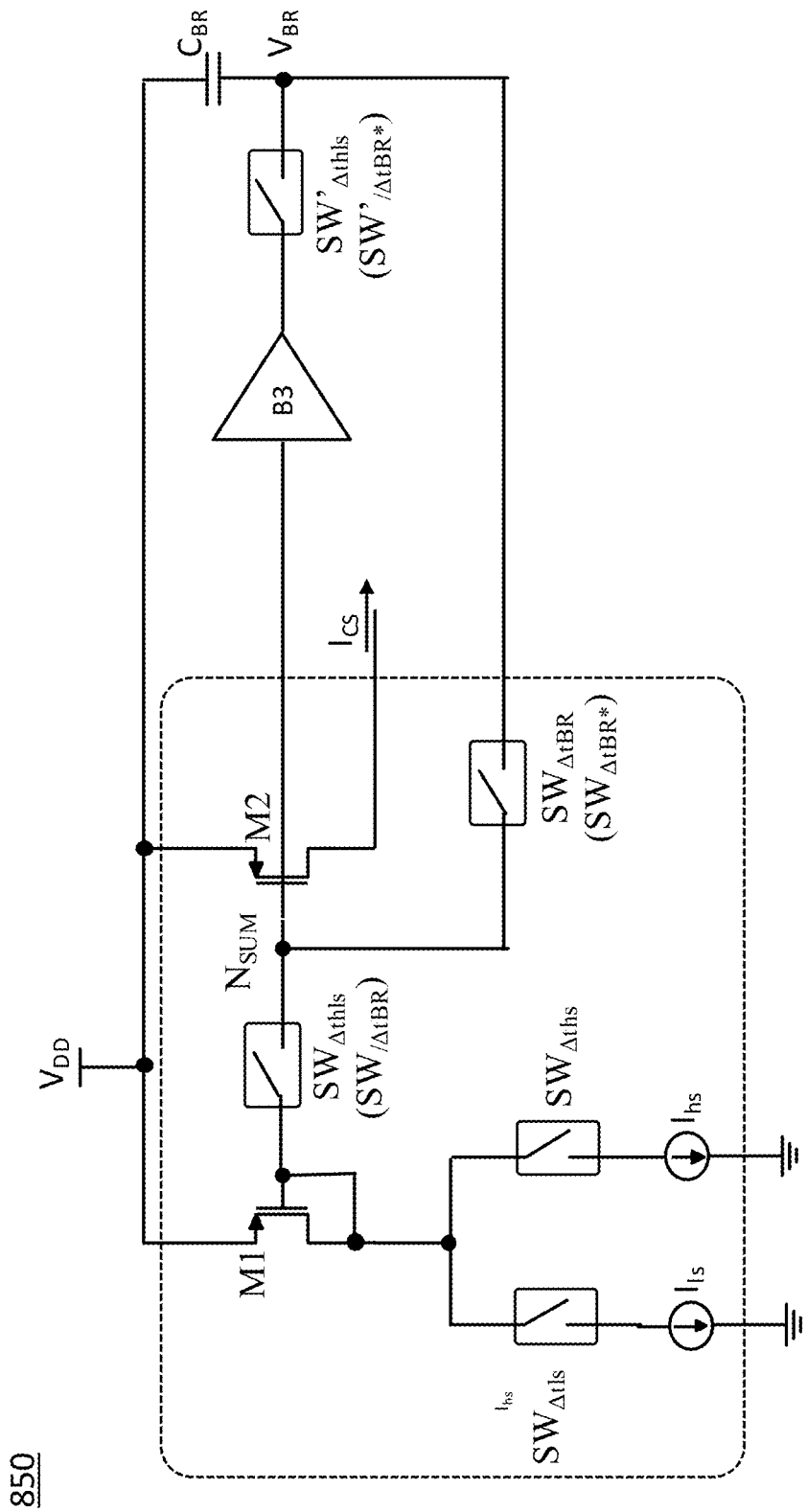
FIG. 8A shows a simplified schematic of a current combiner and bridging circuit according to an embodiment of the present disclosure.
Figure 8B:
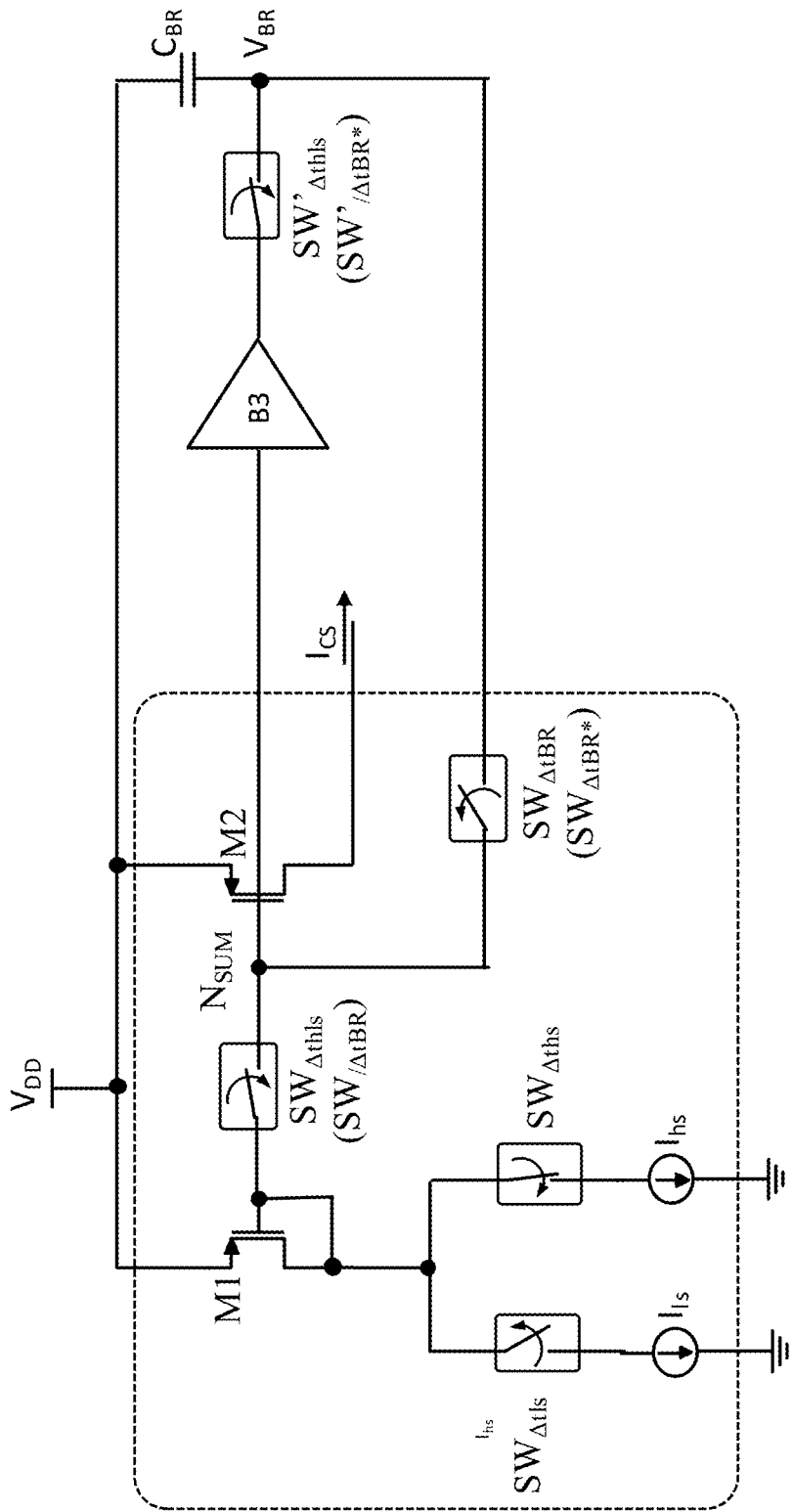
FIG. 8B shows configuration of switches of the circuit of FIG. 8A for combining of sensed currents.

FIG. 8A shows a simplified schematic of a current combiner and bridging circuit (850) according to an exemplary embodiment of the present disclosure that is based on the block diagram described above with reference to FIG. 6, wherein like reference designators refer to like elements. In particular, as shown in FIG. 8B, during a high-side (or low-side) current sensing mode of operation of the circuit (850), the switch, $SW_{\Delta ths}$, may be closed (e.g., ON, activated, during time intervals $\Delta t_{hs}$ is or $\Delta t_{ls}$) and the switch, $SW_{\Delta tBR}$, may be open (e.g., OFF, deactivated), and therefore the diode-connected (PMOS) transistor M1 coupled to the (PMOS) transistor M2 may operate as a current mirror (M1, M2) that produces a voltage at the output node, $N_{SUM}$, so that a current (e.g., sensed currents $I_{ls}$ or $I_{hs}$) through the first leg (e.g., M1 when $SW_{\Delta tls}$ or $SW_{\Delta ths}$ is closed) of the current mirror (M1, M2) is equal (or proportional) to a current (e.g., $I_{CS}$) through the second leg (e.g., M2). At the same time, as shown in FIG. 8B, since the switch, $SW'_{\Delta ths}$, is closed, the node, $V_{BR}$, sees the voltage at the node, $N_{SUM}$, as reproduced through the buffer, B3, and therefore charges the capacitor, $C_{BR}$, to the voltage at the node, $N_{SUM}$, for later use during generation/emulation of the bridging current as shown in FIG. 8C.

Figure 8C:
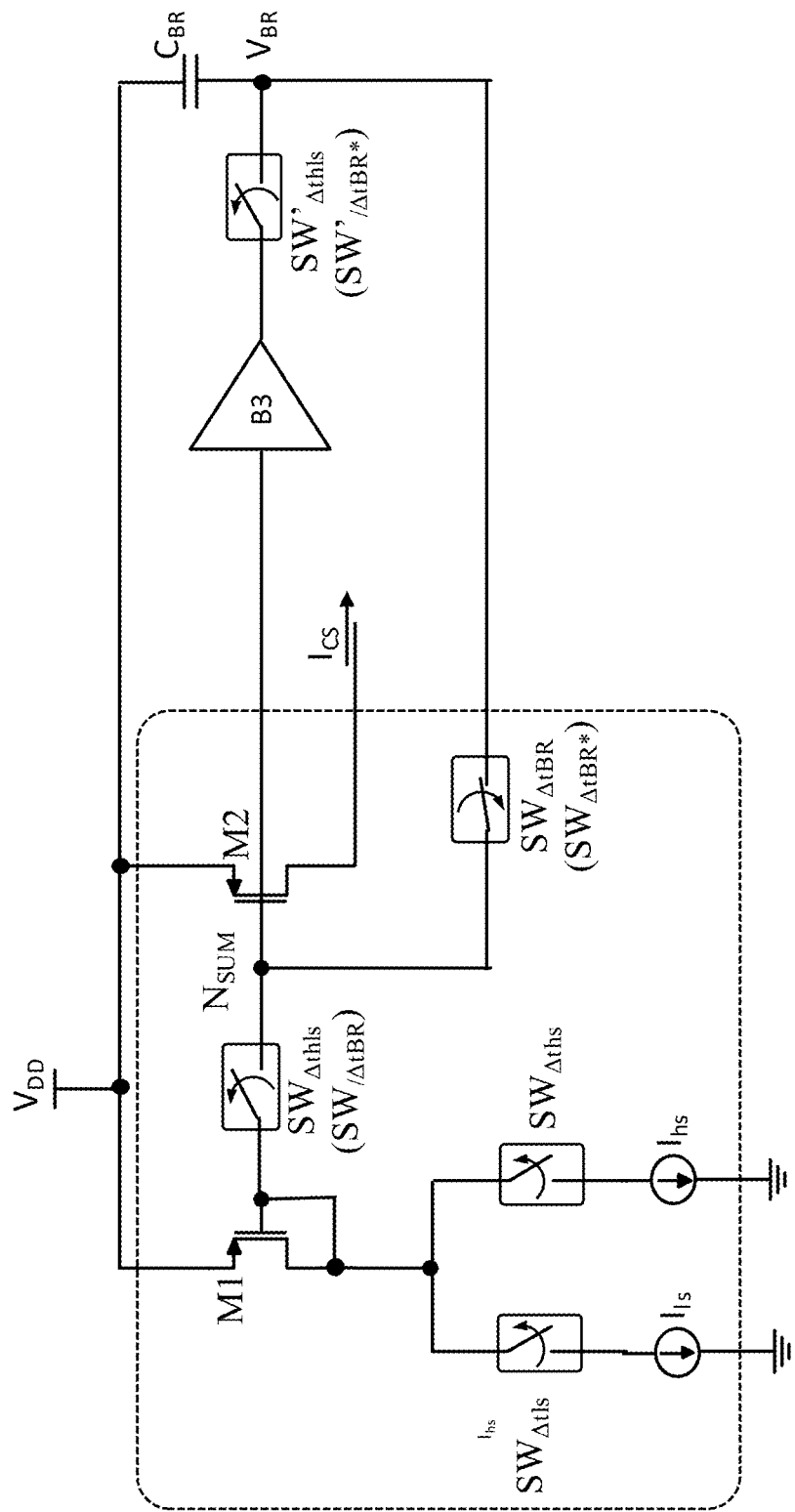
FIG. 8C shows configuration of switches of the circuit of FIG. 8A for combining of bridging currents.

As shown in FIG. 8C, during the generation/emulation of the bridging current (e.g., current based on voltage at node $V_{BR}$), the switch, $SW_{\Delta ths}$, may be open and the switch, $SW_{\Delta tBR}$, may be closed (e.g., ON, activated, during time intervals $\Delta t_{BR1}$ or $\Delta t_{BR2}$), and therefore the diode-connected (PMOS) transistor M1 is decoupled from the (PMOS) transistor M2. Accordingly, the transistor M2 may operate as a common-source transistor reproducing an output current, $I_{CS}$, that is based on the voltage at the output node, $N_{SUM}$, and therefore, based on the voltage stored at the capacitor, $C_{BR}$, for output of the bridging current.

Figure 9:
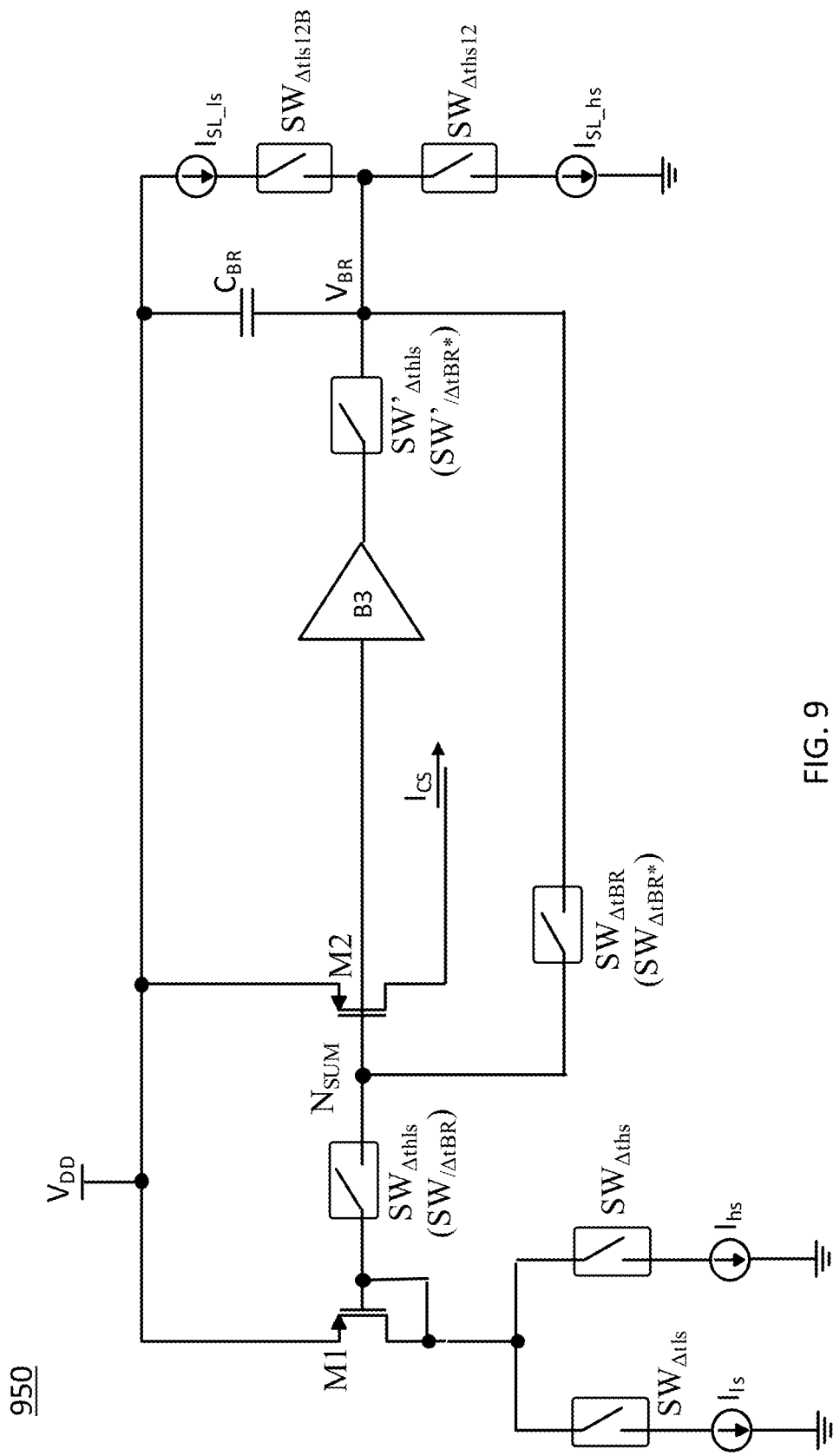
FIG. 9 shows a simplified schematic of a current combiner with bridging circuit, including bridging of sensed currents with slope emulation, according to an embodiment of the present disclosure.

FIG. 9 shows a simplified schematic of a current combiner with bridging circuit (950) according to an exemplary embodiment of the present disclosure that is based on the block diagram described above with reference to FIG. 7A, wherein like reference designators refer to like elements. In particular, the circuit (950) is based on the circuit (850) described above with reference to FIGS. 8A-8C, with the addition of the switches ($SW_{\Delta tls12B}$, $SW_{\Delta ths12}$) that are configured to selectively couple respective low-side and high-side slope currents ($I_{SL\_ls}$, $I_{SL\_hs}$) to the node, $V_{BR}$, thereby, as described above with reference to FIG. 7A, helping to generate/emulate the slope of the segmented bridging current, $I_{BR}$ (e.g., $I_{BR1L}$, $I_{BR1H}$ of FIG. 5). It should be noted that the slope currents ($I_{SL\_ls}$, $I_{SL\_hs}$) may be generated, for example, by the circuit (730) described above with reference to FIG. 7B.

Figure 10A:
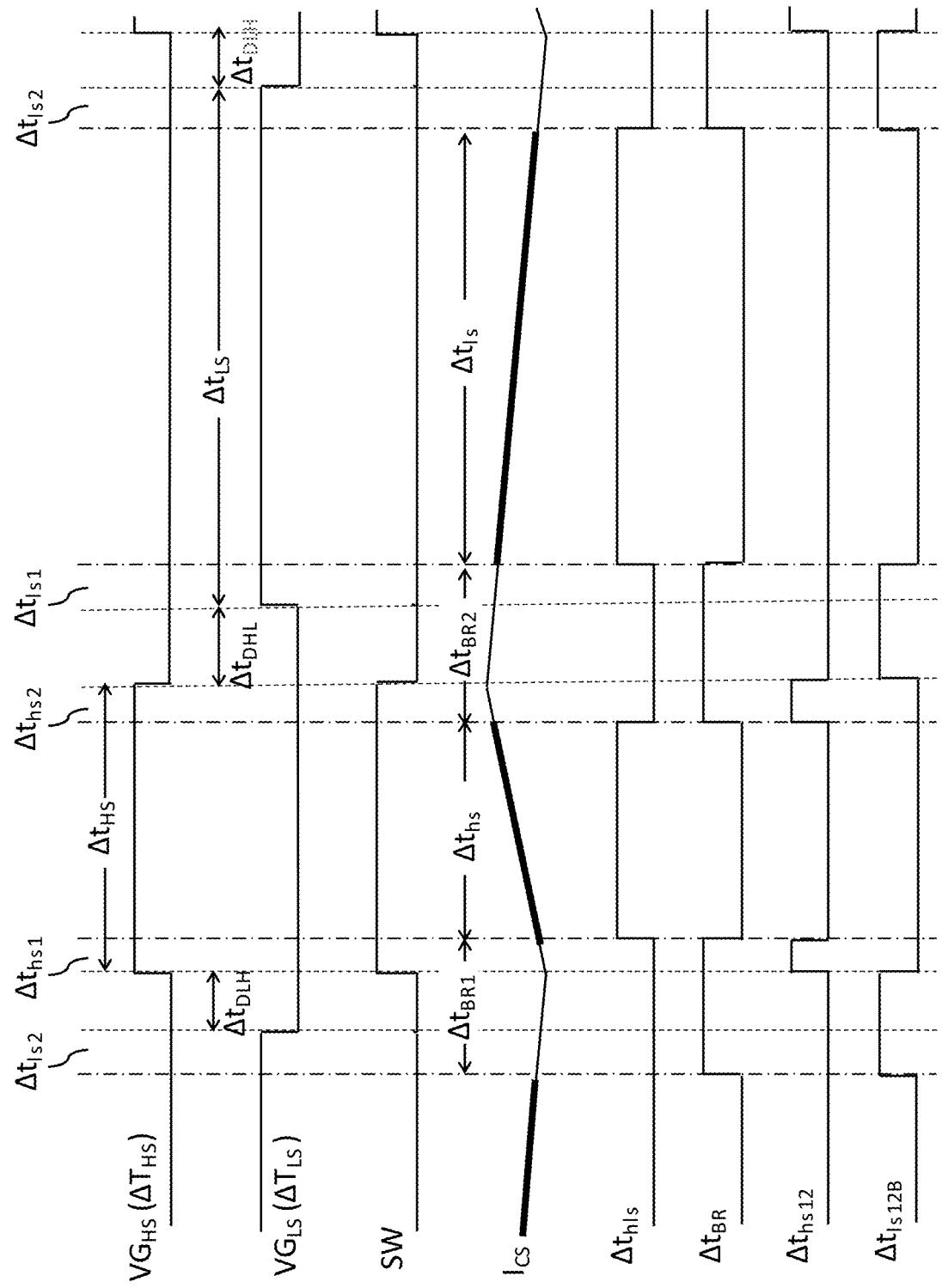
FIG. 10A and FIG. 10B show graphs representative of waveforms and timings of signals during operation of the current sensing circuits of FIGS. 8A-8C and FIG. 9.
Figure 10B:
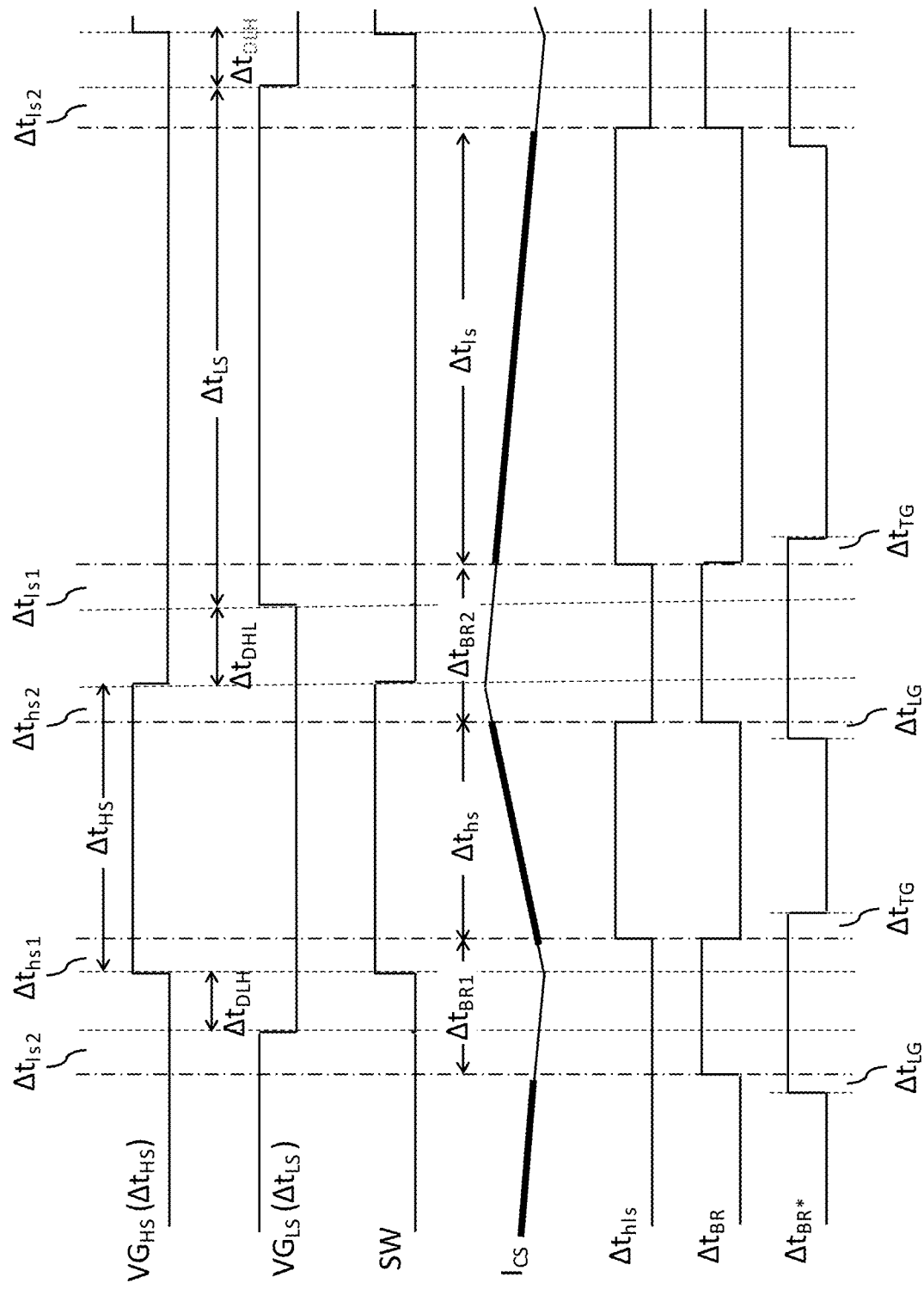

Waveforms and corresponding timings, including for ON (and OFF) control of the switches shown in FIGS. 8A-8C and FIG. 9 are shown in FIG. 10A. These include waveforms and corresponding timings ($\Delta t_{hls}$, $\Delta t_{BR}$, $\Delta t_{hs12}$, $\Delta t_{ls12B}$) of control signals for controlling ON states of the switches ($SW_{\Delta tlhs}$, $SW'_{\Delta tlhs}$, $SW_{\Delta tBR}$, $SW_{\Delta ths12}$, $SW_{\Delta tls12B}$). In particular, as can be seen in FIG. 10A, $\Delta t_{hls}$ and $\Delta t_{BR}$ are complementary signals ($\Delta t_{hls}$=/$\Delta t_{BR}$). According to an embodiment of the present disclosure, timing of the control signals to the switches ($SW_{\Delta tlhs}$, $SW'_{\Delta tlhs}$, $SW_{\Delta tBR}$) shown in FIGS. 8A-8C and FIG. 9 may be further tweaked/optimized in order to prevent a discontinuity in a voltage at the node, $N_{SUM}$, during transitions from sensing to bridging of currents, and vice versa. This is provided via the waveforms shown in FIG. 10C, including a (switch) control signal, $\Delta t_{BR*}$, that is generated by including leading and trailing (timing) guard bands, $\Delta t_{LG}$ and $\Delta t_{TG}$, to (extend) the control signal, $\Delta t_{BR}$. Accordingly, by replacing switches (SW$_{\Delta tlhs}$, SW'$_{\Delta tlhs}$, SW$_{\Delta tBR}$) with switches (SW/$_{\Delta tBR}$, SW/$_{\Delta tBR*}$, SW$_{\Delta tBR*}$) as shown in parentheses in FIGS. 8A-8C and 9, a more robust bridging mechanism may be provided by ensuring that that the node, N$_{SUM}$, is either coupled to the transistor M1 or to the node, V$_{BR}$ (e.g., never floating).

Figure 11A:
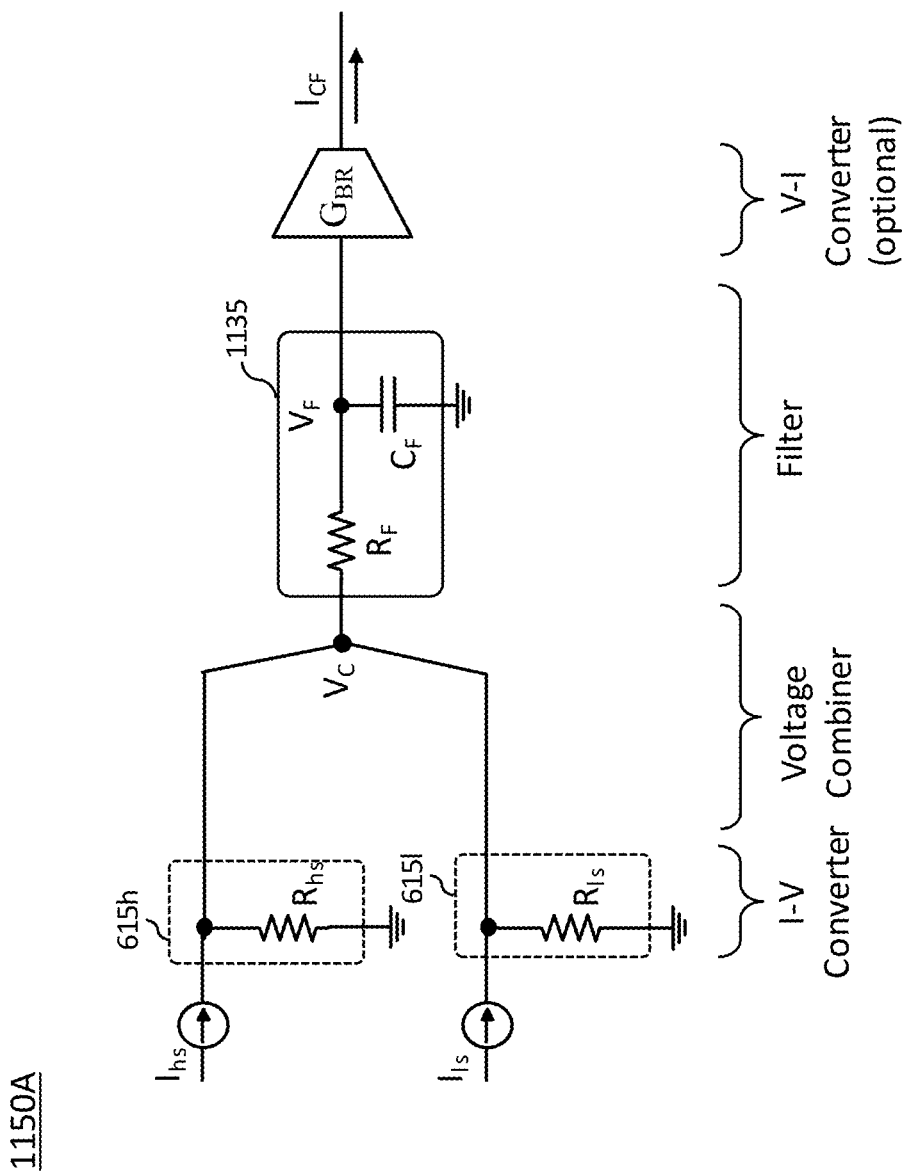
FIG. 11A shows a simplified schematic of a current combiner circuit, including filtering, according to an embodiment of the present disclosure.

FIG. 11A shows a simplified schematic of a current combiner circuit (1150A), including filtering, according to an embodiment of the present disclosure. As shown in FIG. 11A, the low-side and high-side sensed currents (I$_{ls}$, I$_{hs}$) are combined at a common node (e.g., labelled as V$_C$) via a combination of blocks 615l and 615h. A filter (1135) converts the combined voltage, V$_C$, to a filtered version, V$_F$, of the combined voltage. Accordingly, the filtered voltage, V$_F$, may represent the load current (e.g., I$_L$ of FIG. 3). As shown in FIG. 11A, the filter (1135) may include a series resistor, R$_F$, coupled to a shunted capacitor, C$_F$, to provide functionality of a lowpass filter. It should be noted that lowpass filtering may be provided by other type of (more complex) filters, including multistage/multipole filters. An optional transconductance amplifier, GBR, may be used to convert the voltage, V$_F$, to an equivalent (filtered) current, I$_{CF}$, representative of the load current (e.g., I$_L$ of FIG. 3). As later discussed with reference to, for example, FIG. 13A, other type of operations (e.g., via respective circuits/functionalities) may be performed upon the voltage, V$_F$, including, for example, analog-to-digital (ADC) conversion or comparison to a reference voltage, for use in various power converter applications, including, for example, current limit, protection, or average current mode control.

Figure 11B:
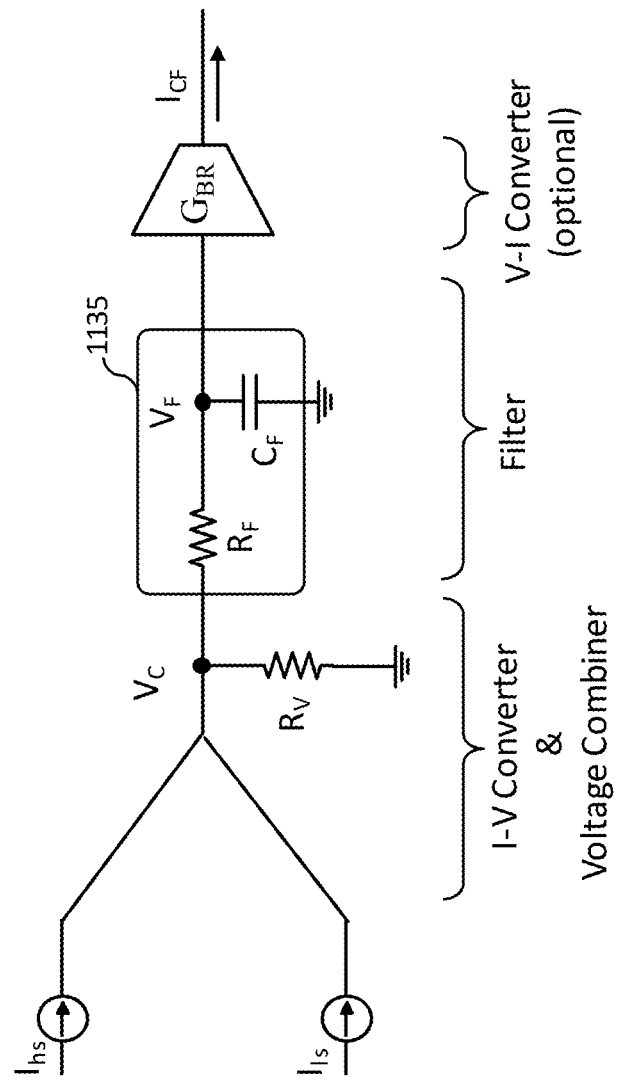
FIG. 11B shows a simplified schematic of another current combiner circuit, including filtering, according to an embodiment of the present disclosure.

FIG. 11B shows a simplified schematic of another current combiner circuit (1150B), including filtering (e.g., via filter 1135), according to an embodiment of the present disclosure. A person skilled in the art would clearly realize that the current combiner circuit (1150B) is based on the current combiner circuit (1150A) described above with reference to FIG. 11A, wherein the (single) resistor, R$_V$, used for converting the sensed currents to the equivalent voltage, V$_C$, replace the parallel combination of resistors (R$_{ls}$, R$_{hs}$) of FIG. 11A. In other words, the circuit (1150B) may be considered equivalent to the circuit (1150A) of FIG. 11A (e.g., since voltage at V$_C$ of FIG. 11A is equal to (I$_{ls}$+I$_{hs}$)* (R$_{ls}$//R$_{hs}$)).

Figure 11C:
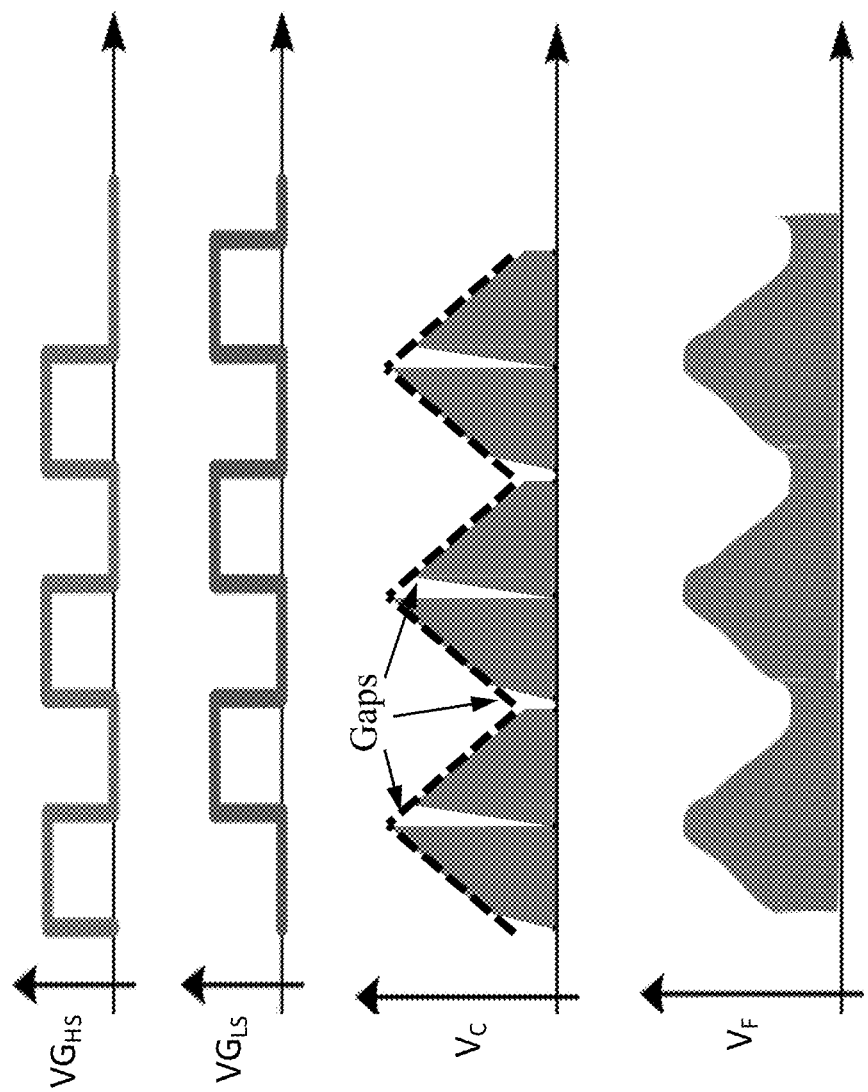
FIG. 11C shows graphs representative of sensed and filtered currents provided by the current combiner circuits of FIG. 11A and FIG. 11B.

FIG. 11C shows graphs representative of sensed (e.g., V$_C$) and filtered (e.g., V$_F$) currents provided by the current combiner circuits (1150A) of FIG. 11A and (1150B) of FIG. 11B. In particular, as shown in FIG. 11C, respective portions of the voltage, V$_C$, corresponding to the sensed high-side current (e.g., Ihs of FIG. 11A/11B, sensed during the ON state of the high-side transistor, M$_{HS}$ of FIG. 3, the ON state provided by a high level VG$_{HS}$) and to the sensed low-side current (e.g., Ils of FIG. 11A/11B, sensed during the ON state of the low-side transistor, M$_{LS}$ of FIG. 3, the ON state provided by a high level VG$_{LS}$) may be separated by gap regions (e.g., labelled as Gaps in FIG. 11C contained within an envelope of an ideal sensed current waveform represented by dashed lines) that may create a discontinuity in the voltage, V$_C$. As shown in FIG. 11C, such discontinuity may be represented with sharp transitions to/from a zero-voltage level of V$_C$. However, as shown in FIG. 11C, filtering of the voltage, V$_C$, may smoothen an envelope of the voltage, V$_C$, and thereby remove the gap regions in the smoothened envelope of the voltage, V$_F$. Because of the combining of the low-side and high-side currents (e.g., via circuits 1150A/B of FIG. 11A/B), filtering of the voltage, V$_C$, may produce a (continuous) voltage, V$_F$, that is representative of the load current (e.g., I$_L$ of FIG. 3) irrespective of an ON/OFF duty cycle of the high-side transistor (e.g., M$_{HS}$ of FIG. 3) or of the low-side transistor (e.g., M$_{LS}$ of FIG. 3). In other words, by sensing low-side and high-side currents, accuracy of sensing/determining the load current (e.g., I$_L$ of FIG. 3) is maintained even in extreme ON/OFF duty cycles when a sensing time for one of the two sensed low-side or high-side currents may be short, as the sensing time for the other of the two sensed low-side or high-side currents may be long. By sensing both the LS and HS currents, the accuracy of the current signal is maintained because at least one of the switches can capture the majority of the current sense signal.

Figure 12A:
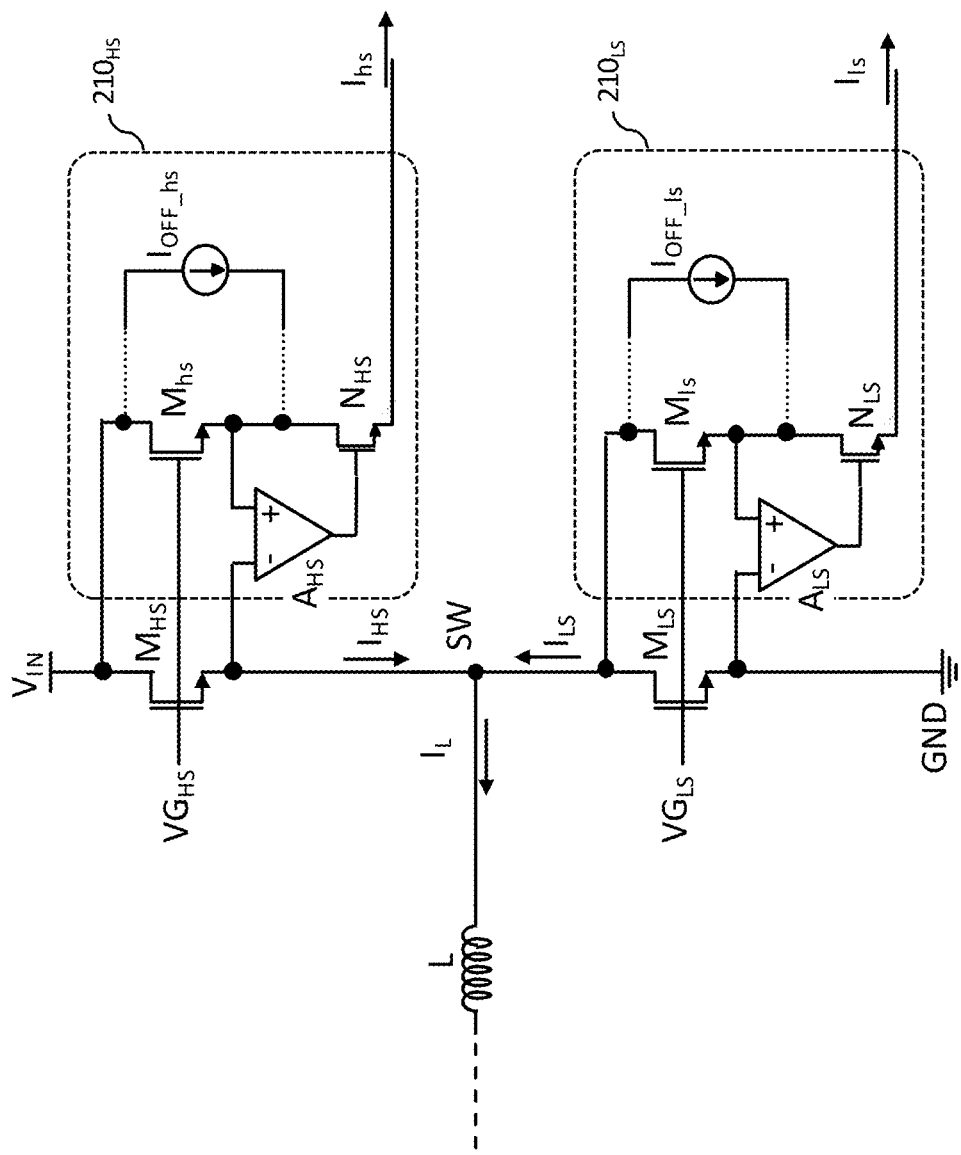
FIG. 12A shows a simplified schematic of a high-side current sensing circuit and a low-side current sensing circuit according to an embodiment of the present disclosure.
Figure 12C:
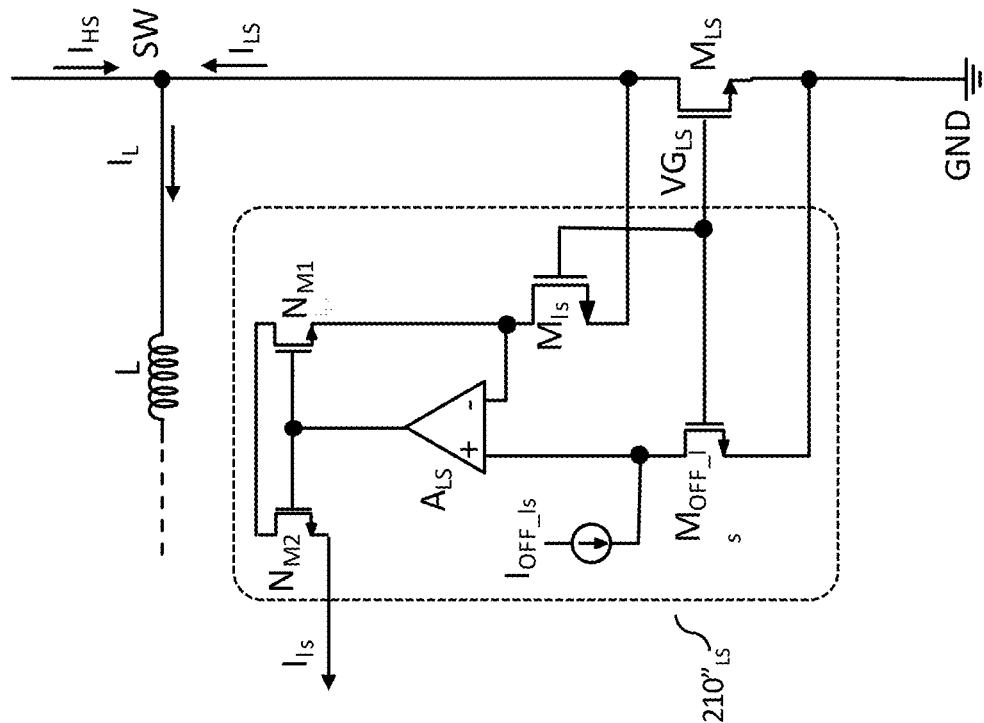
FIG. 12C shows a simplified schematic of another low side current sensing circuit according to an embodiment of the present disclosure that is based on the configuration of FIG. 12B.

FIG. 12A shows a simplified schematic of a high-side current sensing circuit (210$_{HS}$) and a low-side current sensing circuit (210$_{HS}$) according to an embodiment of the present disclosure. As described above with reference to, for example, FIG. 2A, the current sensing circuits (210$_{HS}$, 210$_{LS}$) may include (reduced size) replica transistors, M$_{hs}$ and M$_{ls}$, of the respective transistors M$_{HS}$ and M$_{LS}$. For example, with reference to the high-side current sensing circuit (210$_{HS}$), the gate, source and drain of the replica transistor, M$_{hs}$, may respectively be coupled (e.g., connected) to voltages (e.g., similar to ones) present at the gate, source and drain of the transistor, M$_{HS}$. In particular, such voltages may be provided via direct coupling (e.g., for respective gate and drain voltages) or through coupling at different input terminals of an amplifier (e.g., operational amplifier A$_{HS}$ having positive/negative input terminals at a same voltage). Accordingly, since the gates, sources and drains of the two transistors M$_{hs}$ and M$_{HS}$ are at same voltages, the two transistors may be biased equally and therefore a same (e.g., proportional, ratiometrically related) current may flow through the two transistors.

With continued reference to FIG. 12A, the current flowing through the replica transistor, M$_{hs}$, may be output as the high-side sensed current, I$_{hs}$, through a (high-side output) transistor, (N$_{HS}$, e.g., NMOS) that is arranged in series-connection (e.g., source-to-drain) with the replica transistor, M$_{hs}$. As shown in FIG. 12A, the gate of the transistor, N$_{HS}$, may be coupled to an output of the high-side amplifier, A$_{HS}$, to bias the transistor, N$_{HS}$, for conduction (irrespective of a change in voltage at the source of the transistor M$_{HS}$), and therefore for output of the high-side sensed current, I$_{hs}$. In other words, the coupling of the input terminals of the amplifier A$_{HS}$ to (the sources of) the transistors M$_{hs}$ and M$_{HS}$ may form a feedback loop that controls the gate voltage of the transistor, N$_{HS}$, for conduction of the transistor, N$_{HS}$, in view of changing/varying voltage at the switching node, SW, that is reflected/tracked at the drain of the transistor, N$_{HS}$. Furthermore, as shown in FIG. 12A, a high-side offset current source, I$_{OFF\_hs}$, may further be coupled to the drain of the transistor, N$_{HS}$, to provide, in combination with a current through the replica transistor, M$_{hs}$, the high-side sensed current, Ihs, output by the high-side current sensing circuit (210$_{HS}$).

It should be noted that provision of the high-side offset current source, I$_{OFF\_hs}$, shown in FIG. 12A may be optional and suited for cases where the current to be sensed (e.g., through the high-side transistor, M$_{HS}$) may reach (zero or) negative values. Furthermore, it should be noted that the high-side current sensing circuit (210$_{HS}$) may further include additional circuitry to, for example, conditionally/selectively output the sensed current (e.g., I$_{hs}$), and/or to further manipulate a direction or a magnitude of the output sensed current (e.g., via current mirroring). Furthermore, it should be noted that the NMOS transistor, N$_{HS}$, of FIG. 12A may be replaced with a PMOS transistor (not shown) having its source coupled to the negative input terminal of the amplifier $A_{HS}$ while the positive input terminal is coupled to the source of $M_{HS}$. As shown in FIG. 12A, the low-side current sensing circuit ($210_{LS}$) may include elements ($M_{ls}$, $A_{LS}$, $N_{LS}$, $I_{OFF\_ls}$) which can be likened to elements ($M_{hs}$, $A_{HS}$, $N_{HS}$, $I_{OFF\_hs}$) of the high-side current sensing circuit ($210_{HS}$), and therefore provide equivalent functionality.

Figure 12B:
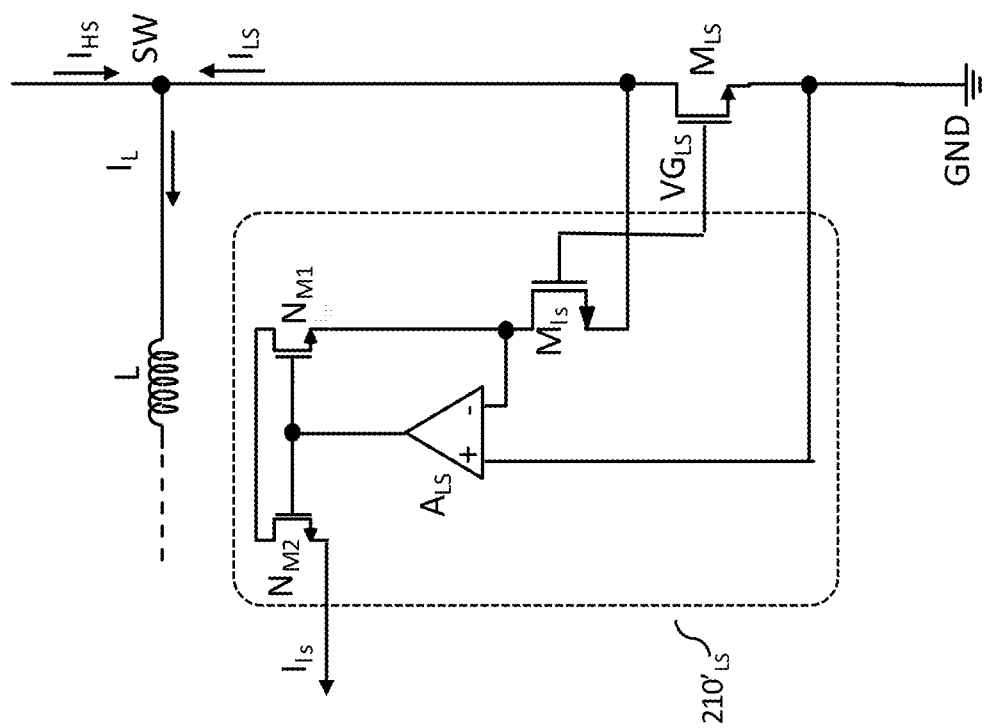
FIG. 12B shows a simplified schematic of another low side current sensing circuit according to an embodiment of the present disclosure.

FIG. 12B shows a simplified schematic of another low side current sensing circuit ($210'_{LS}$) according to an embodiment of the present disclosure. The principle of operation of the circuit ($210'_{LS}$) may be considered different from one described above with reference to FIG. 12A in the sense that instead of controlling (via feedback loop implement by the operational amplifier $A_{LS}$) the gate voltage of the LS (replica) sensing transistor, $M_{ls}$, the drain current of said transistor is controlled via a transistor, $N_{M1}$, that is arranged in series connection with the LS sensing transistor, $M_{ls}$. In turn the current through the transistors $M_{ls}$ and $N_{M1}$ may be replicated through a current mirror (e.g., $N_{M2}$) for output as the sensed LS current, $I_{ls}$. It should be noted that when the LS transistor, $M_{LS}$, conducts, a voltage at the drain of such transistor (and therefore gate of $M_{ls}$) may be slightly negative, the voltage, $VG_{LS}$, at the gate of the LS transistor, $M_{LS}$, (and therefore source of $M_{ls}$) may be positive, and the operational amplifier, $A_{LS}$, may control the drain voltage of the sensing transistor, $M_{ls}$, to zero volts (e.g., voltage at the positive input terminal of $A_{LS}$). Accordingly, similar biasing conditions for the two transistors ($M_{ls}$ and $M_{LS}$) may be maintained. For cases where the sensed current (e.g., $I_{ls}$ through $M_{ls}$) may reach a negative value, an offset current (e.g., $I_{OFF\_ls}$ coupled to a drain of a transistor, $M_{OFF\_ls}$, that is coupled to the positive input of $A_{LS}$) may be added as shown in the modified low side current sensing circuit ($210''_{LS}$) of FIG. 12C to cause the sensed current to be positive.

Figure 13A:
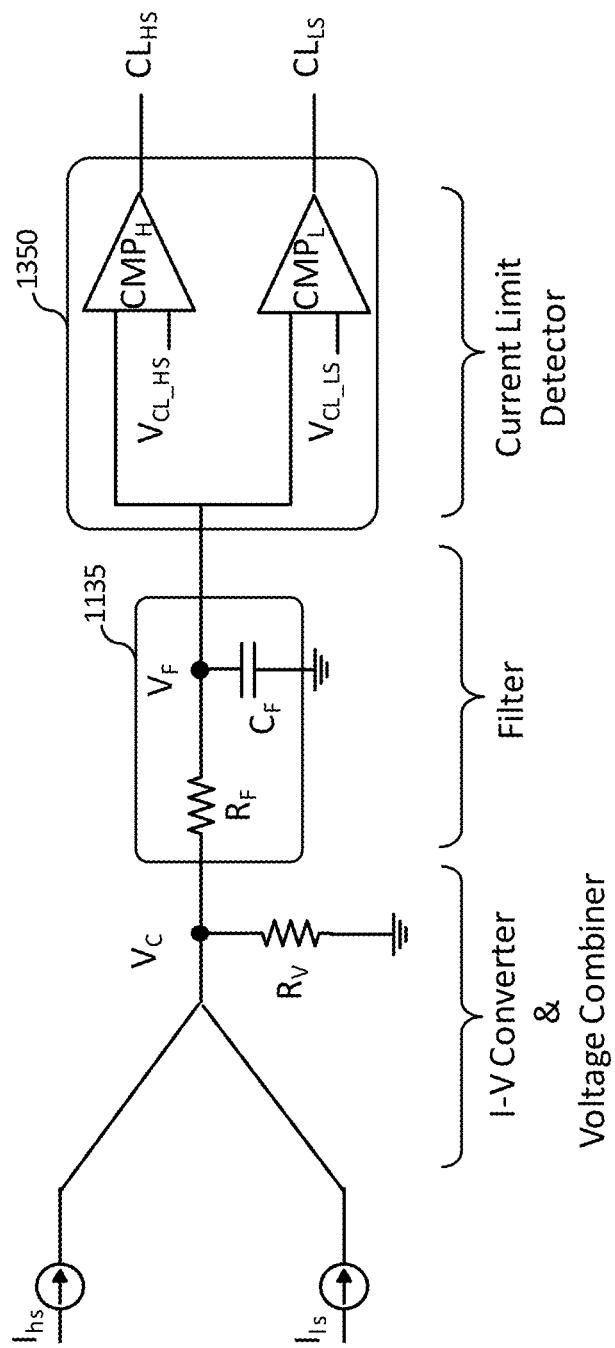
FIG. 13A shows a current limit detector coupled to a current combiner circuit.
Figure 13B:
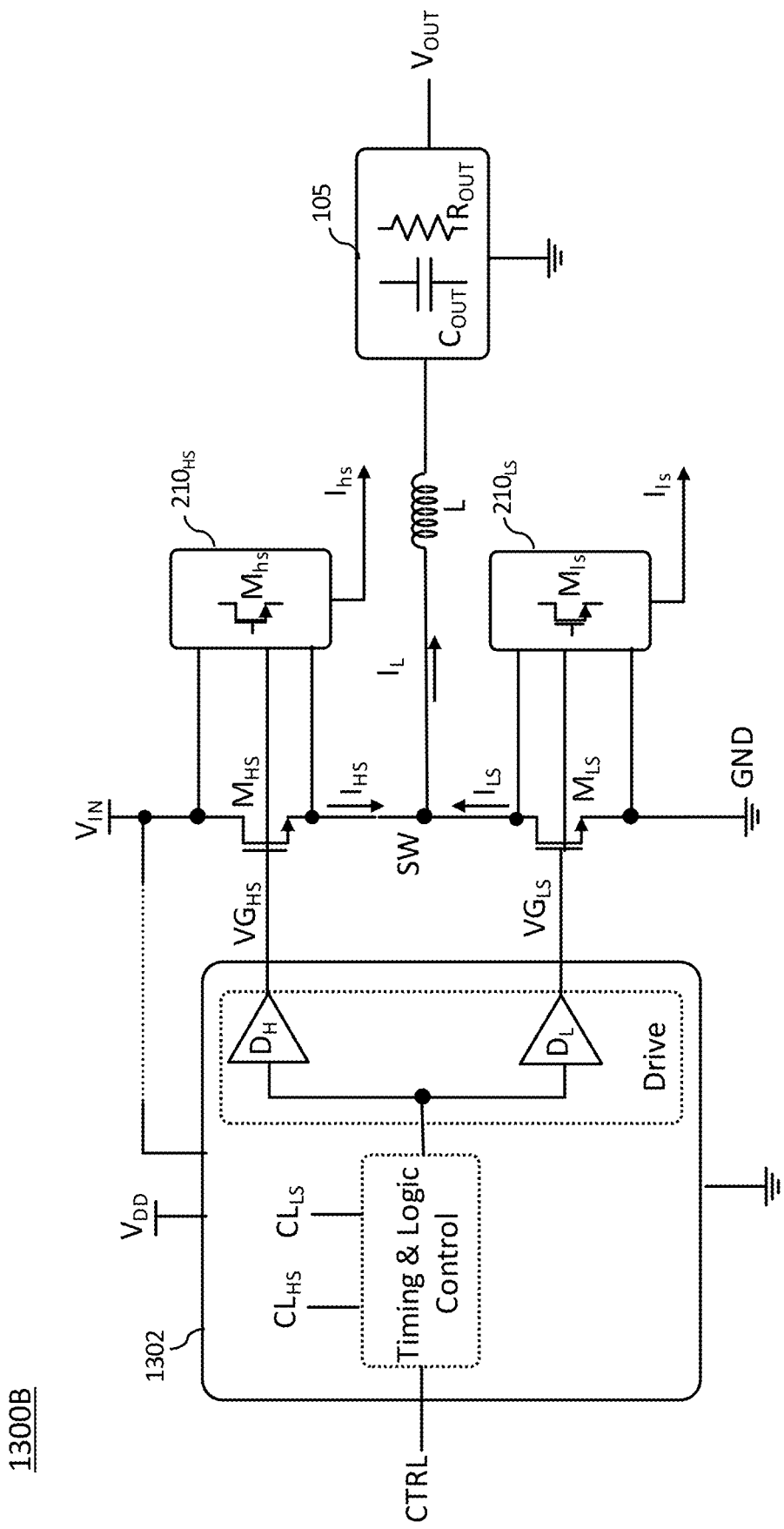
FIG. 13B shows a simplified block diagram of a power converter circuit with output current limit control according to an embodiment of the present disclosure.

FIG. 13A shows a current limit detector circuit (1350) coupled to a current combiner circuit according to an embodiment of the present disclosure. In the particular nonlimiting configuration of FIG. 13A, the current combiner circuit is shown as the current combiner circuit (1150B) described above with reference to FIG. 11B, which may provide the filtered voltage, $V_F$, as input to the current limit detector (1350). Two comparators, $CMP_H$ and $CMP_L$, comprised in the limit detector (1350), may be used to respectively detect high and low current limits (e.g., peak currents) based on corresponding voltage references, $V_{CL\_HS}$ and $V_{CL\_LS}$. For example, when the filtered voltage, $V_F$, is above the voltage reference, $V_{CL\_HS}$, the comparator, $CMP_H$, may trigger to set the output status flag, $CL_{HS}$, true (e.g., high level), to indicate for example an excessive load current level (e.g., $I_L$ through inductor L of FIG. 3), and when the filtered voltage, $V_F$, is below the voltage reference, $V_{CL\_HS}$, the comparator, $CMP_H$, may trigger to reset the output status flag, $CL_{HS}$, false (e.g., low level), to indicate for example a normal (e.g. desired) load current level. It should be noted that such comparators, $CMP_H$ and $CMP_L$, may be designed to include hysteresis in order reduce mis-triggering due to, for example, a slow moving/changing envelope signal. Similarly, the comparator, $CMP_L$, may trigger to set or reset the output status flag, $CL_{LS}$, indicative of an insufficient or normal load current level. Accordingly, normal load current level may be provided/present when both output status flags, $CL_{HS}$ and $CL_{LS}$, are set to false. Such output status flags may in turn be used to control (gate) drive to the high-side and low-side transistors ($M_{HS}$, $M_{LS}$) as shown in FIG. 13B. It should be noted that the configuration shown in FIG. 13A may not be limited to use of the current combiner circuit (1150B) of FIG. 11B, rather, anyone of the current combiner circuits described above, either with or without filtering or current bridging may be used. In some cases, the combined current may need to be converted to a voltage for input to the current limit detector circuit (1350).

FIG. 13B shows a simplified block diagram of a power converter circuit (1300B) with output current limit control according to an embodiment of the present disclosure. The sensed currents ($I_{ls}$, $I_{hs}$) may be used to generate a voltage (e.g., $V_F$ of FIG. 11A/11B) representative of the load current, $I_L$, according to, for example, any one of the above-described embodiments with reference to FIG. 11A/B and detect the high/low limits of such voltage according to the above-described embodiment with reference to FIG. 13A. In turn, as shown in FIG. 13B, the output status flags, $CL_{HS}$ and $CL_{LS}$, may be fed to a digital portion (e.g., Timing & Logic Control) of a timing control and drive circuit block (1302) of the power converter circuit (1300B) that is configured to generate (e.g., drive) the gates of the high-side and low-side transistors ($M_{HS}$, $M_{LS}$). Responsive to the provided status flags, $CL_{HS}$ and $CL_{LS}$, the Timing & Logic Control circuit block may control the drive to maintain (e.g., regulate) the load current, $I_L$, within desired/normal operating levels. For example, if a high current limit is reached (e.g., $CL_{HS}$ set true) the high-side transistor, $M_{HS}$, may be controlled to be turned OFF, and if a low current limit is reached (e.g., $CL_{LS}$ set true), the low-side transistor, $M_{LS}$, may be controlled to be turned OFF.

With continued reference to FIG. 13B, input to the timing control and drive circuit block (1302) may be provided by a control pulse signal, CTRL, generated through a feedback control loop. The control pulse signal, CTRL, may determine/adjust ON/OFF duty cycle of the power converter circuit (1300B) based on an output (DC) voltage level, $V_{OUT}$. For example, with reference to FIG. 13C, the circuit block (1305) may compare the output voltage, $V_{OUT}$, to a reference voltage, Vref, via an error amplifier, EA1, and generate therefrom an (analog) error signal, $V_{EA1}$, that is fed to a comparator, CMP. In turn, the comparator, CMP, may compare the error signal, $V_{EA1}$, to a ramp signal ($V_{Ramp}$, e.g., periodic ramp signal, triangular signal, etc.) to derive a duty cycle of the control pulse signal, CTRL, and therefore of the power converter circuit (1300B of FIG. 13B). Accordingly, the output voltage level, $V_{OUT}$, may be controlled to an average level that is based on the reference voltage, Vref.

Figure 13C:
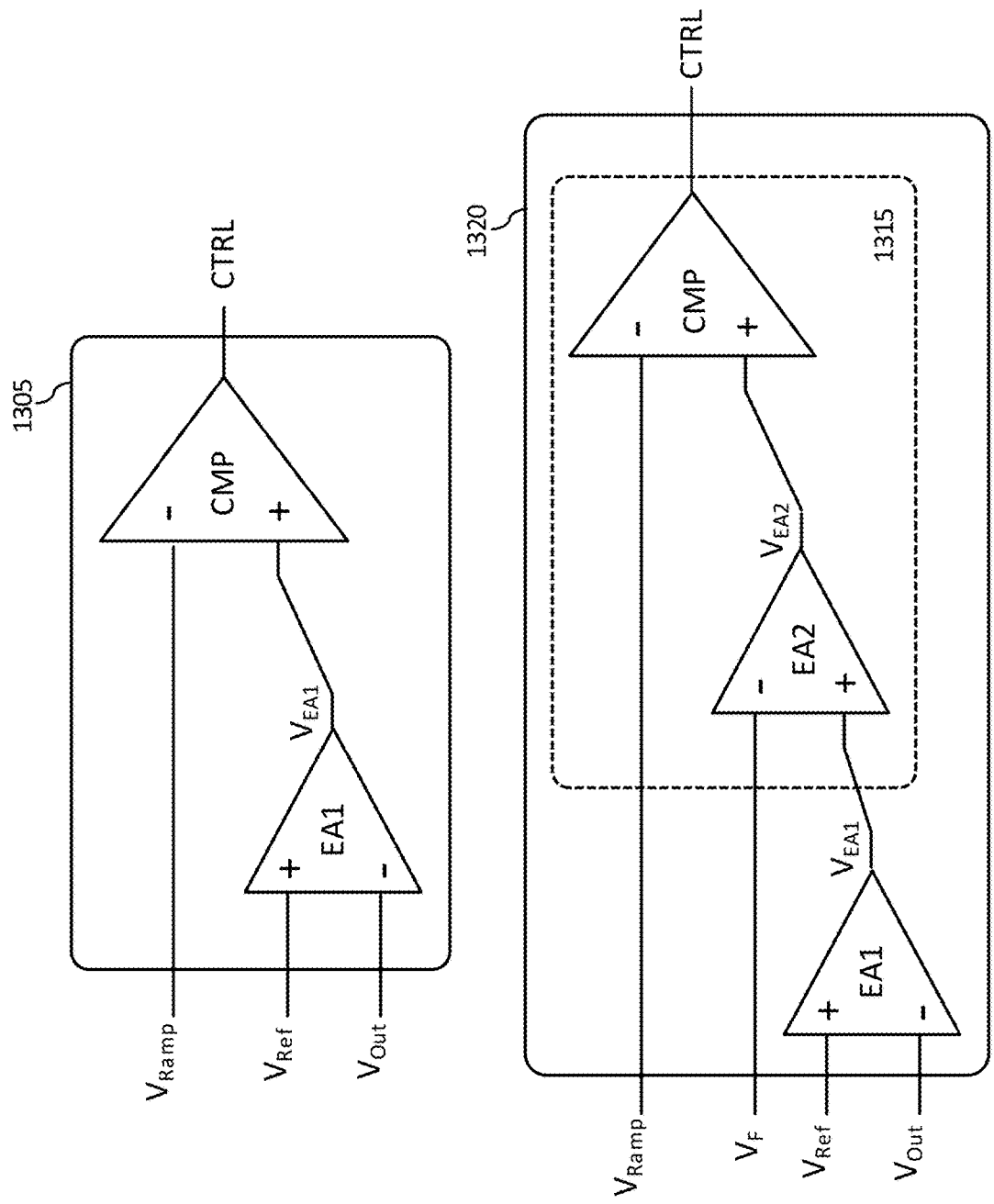
FIG. 13C shows simplified block diagrams of circuits for input control of a power converter circuit.

According to an embodiment of the present disclosure, in addition to controlling of the (average) output voltage level, a level (e.g., average level) of the load current (e.g., $I_L$ of FIG. 3) may be controlled via the circuit block (1320) of FIG. 13C. The circuit block (1320) adds an additional level of error detection via an additional error amplifier, EA2, that generates an additional error signal, $V_{EA2}$, based on a difference between the error signal, $V_{EA1}$, and a voltage (e.g., $V_F$ of FIG. 11A/11B) representative of a level of the load current. In turn, the additional error signal, $V_{EA2}$, is fed to the comparator, CMP, for comparison to the ramp signal, $V_{Ramp}$. Such control scheme, which may be referred to as average current mode control, may allow further control of the duty cycle in order to maintain a desired level of the load current. It should be noted that the average current mode control scheme may be used together with, or separate from, the current limit scheme described above with reference to FIG. 13A/13B.

Figure 14A:
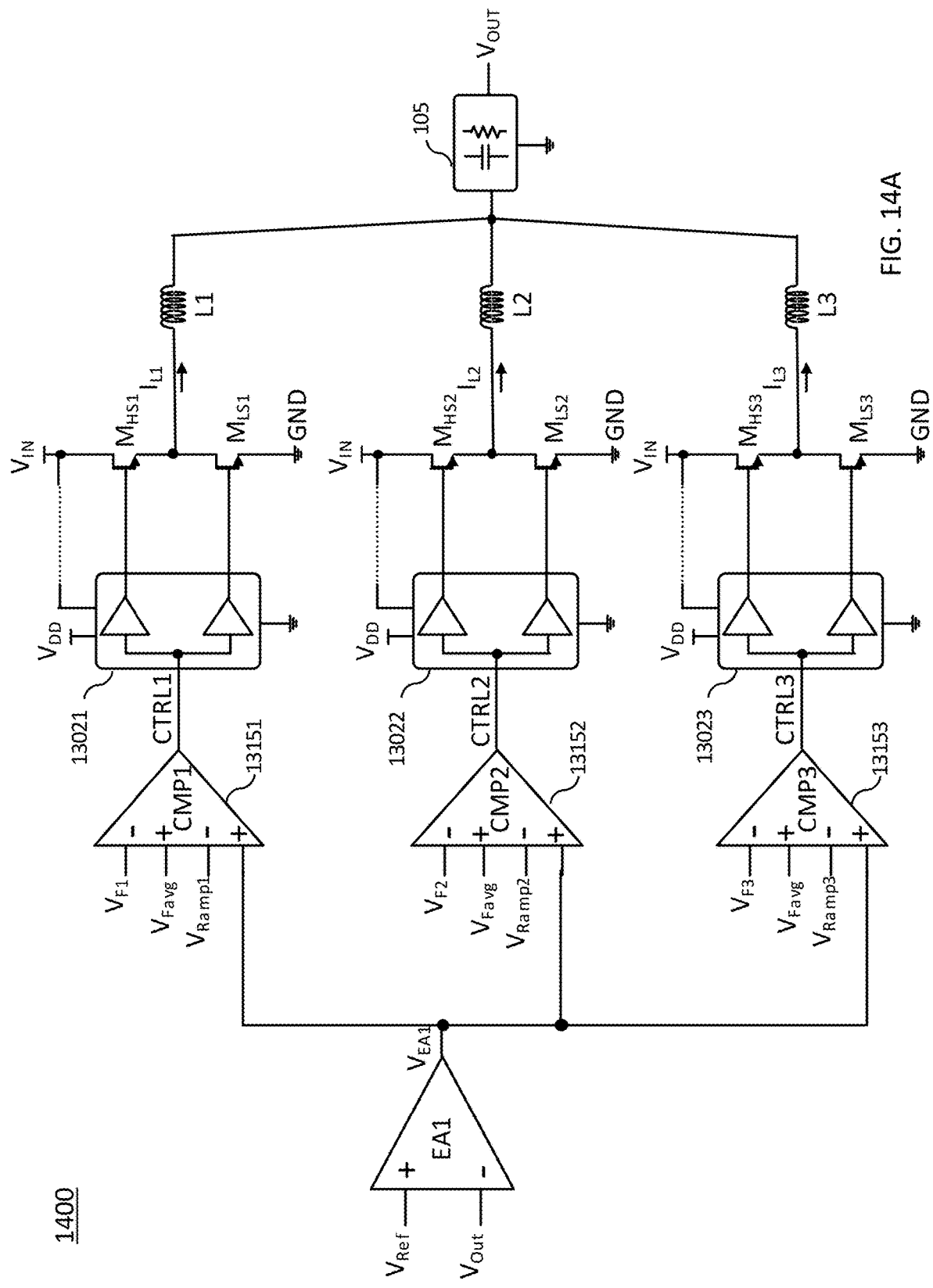
FIG. 14A shows a simplified block diagram of a multiphase power converter circuit with current balancing according to an embodiment of the present disclosure.
Figure 14B:
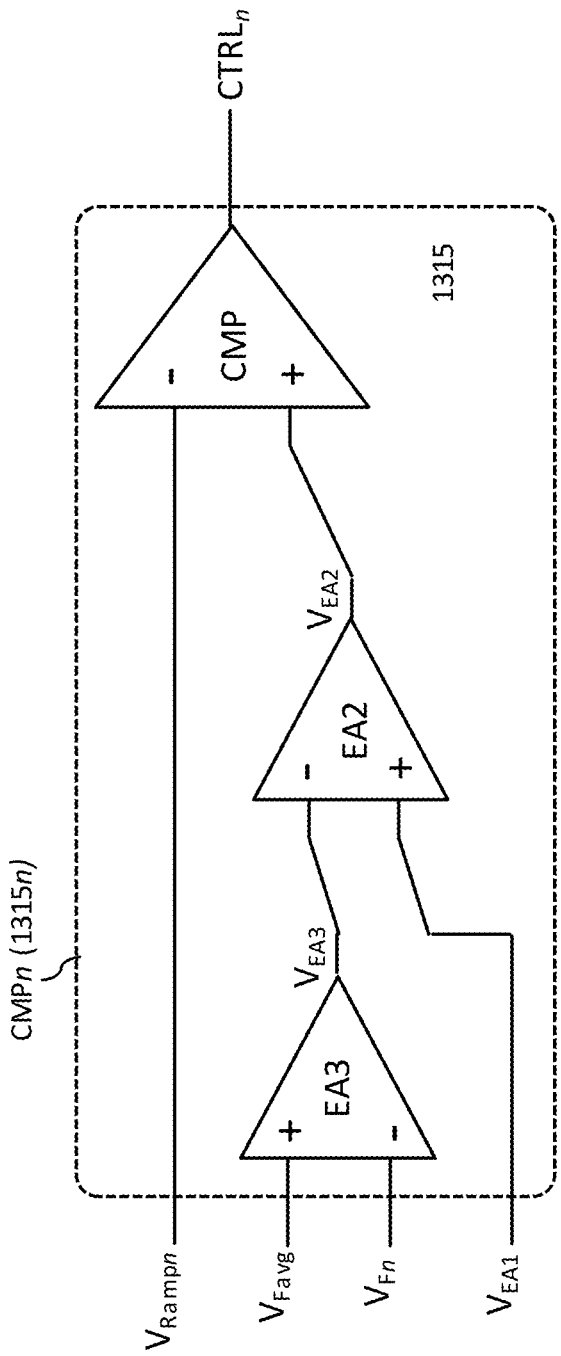
FIG. 14B shows a simplified block diagram of a circuit for input control of the multiphase power converter circuit of FIG. 14A.

FIG. 14A shows a simplified block diagram of a multi-phase (e.g., three in this exemplary nonlimiting embodiment) power converter circuit (1400) with current balancing according to an embodiment of the present disclosure. Such configuration may be considered as an extension of the configuration described above with reference to blocks (1300B, 1320) of FIG. 13B and FIG. 13C, to include a plurality of similar blocks, each for processing of one of the phases, coupled to a common output load (105). For example, as shown in FIG. 14A, a first error amplifier, EA1, that is common to all of the phases may generate the first error signal, $V_{EA1}$, as described above, and feed to each phase. In turn, a respective comparator and error amplifier circuit block (13151, ..., 13153, respectively labelled as CMP1, ..., CMP3) of each of the phases may generate error signals in a manner similar to the above description with reference to block (1320) of FIG. 13C, to finally generate a respective control pulse signal (e.g., CTRL1, ..., CTRL3) for the respective timing control and drive circuit block (e.g., 13021, ..., 13023). In particular, as shown in FIG. 14B, each of the circuit blocks (1315n, n=1, 2, 3, ..., etc.) may compare the $V_{Ramp}$ signal (e.g., $V_{Rampn}$, n=1, 2, 3, ..., etc.) to an error signal, $V_{EA2}$, that is based on a difference between the first error signal, $V_{EA1}$, and a third error signal, $V_{EA3}$. As shown in FIG. 14B, the third error signal, $V_{EA3}$, may be based on a difference between a voltage (e.g., $V_{Fn}$) representative of a load current through a phase (e.g., one of load currents $I_{L1}$, $I_{L2}$ or $I_{L3}$ of FIG. 14A) and a voltage (e.g., $V_{Favg}$) representative of an average load current through the plurality (e.g., three) of phases (e.g., total current through the load 105 divided by number of phases). Accordingly, the configuration shown in FIG. 14A may allow balancing of the load currents through the different phases by minimizing error between each load current and an average load current (per phase) that is fed to the output load (105).

Figure 14C:
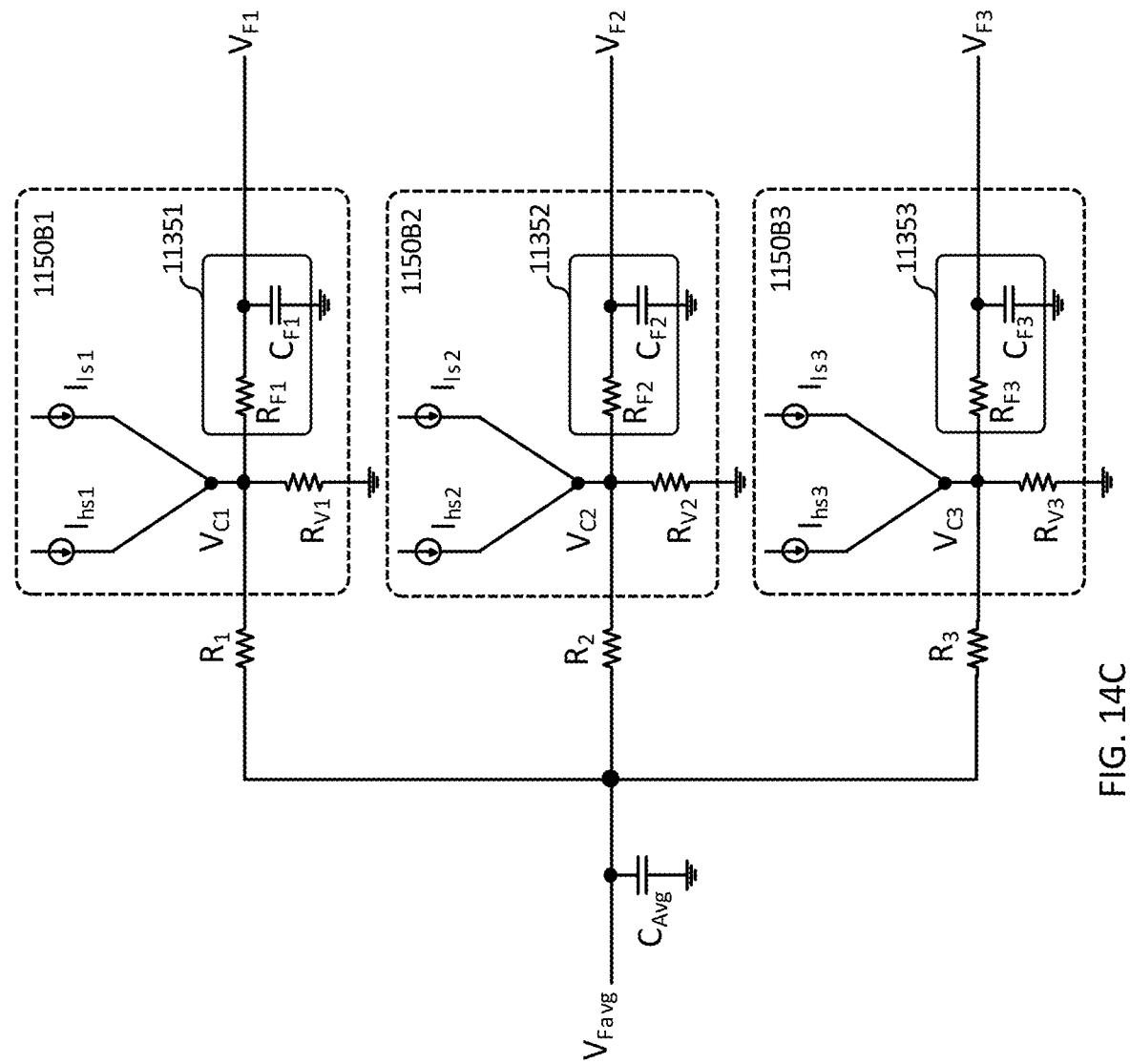
FIG. 14C shows a simplified block diagram of an average output current detector circuit according to an embodiment of the present disclosure.

An exemplary embodiment according to the present disclosure for derivation of the voltages $V_{Fn}$, for n=1, 2, 3, and of the voltage, $V_{Favg}$, described above with reference to FIG. 14B is shown in FIG. 14C. This includes a respective current combiner circuit (e.g., 1150B1, ..., 1150B3) for derivation of each of the voltages $V_{Fn}$, n=1, 2, 3, and a capacitor, $C_{Avg}$, coupled to each of the nodes $V_{Cn}$, n=1, 2, 3, through a respective resistor $R_n$, n=1, 2, 3, for derivation of the voltage, $V_{Favg}$. It should be noted that the configuration shown in FIG. 14C may not be limited to use of a current combiner circuit (e.g., 1150B1, ..., 1150B3) that is based on the current combiner circuit (1150B) of FIG. 11B, rather, anyone of the current combiner circuits described above, either with or without filtering or current bridging may be used.

Figure 15:
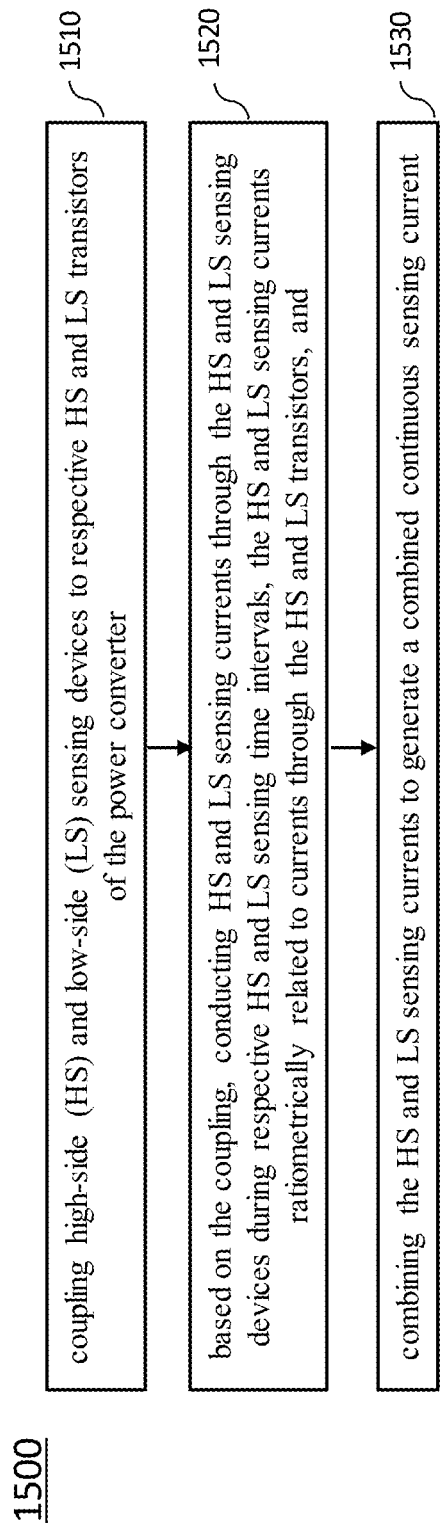
FIG. 15 is a process chart showing various steps of a method according to the present disclosure for sensing a load current of a power converter Like reference numbers and designations in the various drawings indicate like elements.

FIG. 15 is a process chart (1500) showing various steps of a method according to the present disclosure for sensing a load current of a power converter. As shown in FIG. 15 such steps comprise: coupling high-side (HS) and low-side (LS) sensing devices to respective HS and LS transistors of the power converter, per step (1510); based on the coupling, conducting HS and LS sensing currents through the HS and LS sensing devices during respective HS and LS sensing time intervals, the HS and LS sensing currents ratiometrically related to currents through the HS and LS transistors, per step (1520); and combining the HS and LS sensing currents to generate a combined continuous sensing current, per step (1530), wherein the HS sensing time interval and the LS sensing time interval are separate and non-overlapping.

Throughout the present disclosure, transistors have been used as examples to describe HS and LS sensing devices. The person skilled in the art will understand that other embodiments are also possible, such as using adequately sized resistors as HS and LS sensing devices.

Throughout the present disclosure, capacitors selectively coupled to a sensed HS voltage or to a sensed LS voltage have been described. The person skilled in the art will understand that other kinds of energy storage elements are also possible, such as an inductor, coupled a sensed HS current or a sensed LS current.

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs enable various functionalities as communication, power management, signal conditioning, data conversion and processing or digital processing.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

The invention claimed is:

1. A current sensing circuit for a power converter, comprising:
   a high-side (HS) current sensing circuit comprising a HS sensing device configured to sense, during a HS sensing time interval, a HS current through a conducting HS transistor of the power converter;
   a low-side (LS) current sensing circuit comprising a LS sensing device configured to sense, during a LS sensing time interval, a LS current through a conducting LS transistor of the power converter;
   a current combiner circuit coupled to the HS and LS current sensing circuits, the current combiner circuit configured to combine the HS current and the LS current and generate therefrom a combined continuous sensing current;
   an energy storage element directly or indirectly coupled to sensed HS and LS currents, and
   a current-to-voltage converter configured to convert sensed HS and LS currents to sensed HS and LS voltages,
   wherein
      the HS sensing time interval and the LS sensing time interval are separate and non-overlapping,
      the energy storage element is a capacitor selectively coupled to the sensed HS voltage or to the sensed LS voltage via respective HS and LS sampling switches,
      the HS sampling switch couples the sensed HS voltage to the capacitor during a portion of the HS sensing time interval, and
      the LS sampling switch couples the sensed LS voltage to the capacitor during a portion of the LS sensing time interval.

2. The current sensing circuit of claim 1, wherein:
   the current combiner circuit further comprises a voltage-to-current converter coupled to the capacitor, the voltage-to-current converter configured to generate bridging currents during bridging time intervals between the HS sensing time interval and the LS sensing time interval.

3. The current sensing circuit of claim 2, wherein the current combiner circuit further comprises:
   a HS current combiner switch that selectively conducts the sensed HS current to an output current node during the HS sensing time interval;
   a LS current combiner switch that selectively conducts the sensed LS current to the output current node during the LS sensing time interval; and
   a bridging current combiner switch that selectively conducts the bridging currents to the output current node during the bridging time intervals.

4. The current sensing circuit of claim 2, wherein:
   the bridging time intervals comprise a first bridging time interval that follows the LS sensing time interval and leads to the HS sensing time interval, and a second bridging time interval that follows the HS sensing time interval and leads to the LS sensing time interval, and
   the bridging currents generated during the first bridging time interval and during the second bridging time interval respectively comprise one or more bridging current segments.

5. The current sensing circuit of claim 4, wherein:
   the one or more bridging current segments consists of a single current segment having a constant current value.

6. The current sensing circuit of claim 5, wherein:
   the constant current value of the single current segment generated during the first bridging time interval is based on a value of the sensed LS voltage, and
   the constant current value of the single current segment generated during the second bridging time interval is based on a value of the sensed HS voltage.

7. The current sensing circuit of claim 4, wherein:
   the one or more bridging current segments consist of two current segments having respective first and second slopes, the first slope based on a rate of change of one of the sensed HS or LS voltages, and the second slope based on a rate of change of the other.

8. The current sensing circuit of claim 1, wherein:
   the current combiner circuit further comprises HS and LS voltage-to-current converters selectively coupled to the capacitor and configured to generate respective HS and LS slope currents based on the rate of change of the sensed HS and LS voltages.

9. The current sensing circuit of claim 1, wherein:
   the current-to-voltage converter comprises a resistor that generates the sensed HS or LS voltages through conduction of the sensed HS or LS currents.

10. The current sensing circuit of claim 1, wherein:
    the current-to-voltage converter comprises a diode-connected PMOS transistor.

11. The current sensing circuit of claim 10, wherein:
    a drain of the diode-connected PMOS transistor is selectively coupled to the HS sensing transistor during the HS sensing time interval, and
    the drain of the diode-connected PMOS transistor is selectively coupled to the LS sensing transistor during the LS sensing time interval.

12. The current sensing circuit of claim 1, wherein:
    the energy storage element is a capacitor coupled to the sensed HS and LS voltages through a resistor, a first terminal of the resistor coupled to the capacitor and a second terminal of the resistor coupled to the sensed HS and LS voltages at a common voltage node.

13. The current sensing circuit of claim 12, wherein:
    the capacitor and the resistor form a low pass filter that is configured to filter a voltage at the common voltage node and output a filtered voltage at the first terminal of the resistor, the filtered voltage comprising a smoothened envelope.

14. The current sensing circuit of claim 1, wherein:
the current-to-voltage converter comprises a resistor that generates the sensed HS or LS voltages through conduction of the sensed HS or LS currents.

15. The current sensing circuit of claim 1, wherein:
the HS and LS sensing transistors are reduced size replica of the respective HS and LS transistors.

16. A current sensing circuit for a power converter, wherein comprising:
a high-side (HS) current sensing circuit comprising a HS sensing device configured to sense, during a HS sensing time interval, a HS current through a conducting HS transistor of the power converter;
a low-side (LS) current sensing circuit comprising a LS sensing device configured to sense, during a LS sensing time interval, a LS current through a conducting LS transistor of the power converter;
a current combiner circuit coupled to the HS and LS current sensing circuits, the current combiner circuit configured to combine the HS current and the LS current and generate therefrom a combined continuous sensing current; and
an energy storage element directly or indirectly coupled to sensed HS and LS currents, wherein
the HS and LS sensing transistors are reduced size replica of the respective HS and LS transistors, and
each of the HS and LS sensing circuits comprises a respective operational amplifier that is coupled to the respective HS or LS sensing transistor.

17. The current sensing circuit of claim 16, wherein:
a source of each of the HS and LS transistors is coupled to a first input of the respective operational amplifier,
a source of each of the HS and LS sensing transistors is coupled to a second input of the respective operational amplifier,
a gate of each of the HS and LS sensing transistors is coupled to a gate of a respective HS or LS transistor, and
a drain of each of the HS and LS sensing transistors is coupled to a drain of a respective HS or LS transistors.

18. The current sensing circuit of claim 16, wherein:
a source of the LS transistor is coupled to a first input of the respective operational amplifier,
a source of the LS sensing transistor is coupled to a drain of the LS transistor,
a gate of the LS sensing transistor is coupled to the gate of the LS transistor, and
a drain of the LS sensing transistor is coupled to a second input of the respective operational amplifier.

19. The current sensing circuit of claim 16, wherein:
the LS sensing circuit comprises an additional reduced size replica of the LS transistor and a current source coupled to a drain of the additional reduced size replica,
a source and a gate of the LS transistor are respectively coupled to a source and a gate of the additional reduced size replica,
a drain of the additional reduced size replica is coupled to a first input of the respective operational amplifier,
a drain of the LS sensing transistor is coupled to a second input of the respective operational amplifier,
a gate of the LS sensing transistor is coupled to the gate of the LS transistor, and
a source of the LS sensing transistor is coupled to a drain of the LS transistor.

20. A power converter circuit, comprising:
a high-side (HS) transistor and a low-side (LS) transistor in series connection and coupled between a first voltage and a reference ground;
an inductor coupled to a source of the HS transistor and to a drain of the LS transistor at a common switching node; and
a current sensing circuit coupled to the HS and LS transistors,
the current sensing circuit comprising:
a high side (HS) current sensing circuit configured to sense a HS current through the HS transistor; and
a low side (LS) current sensing circuit configured to sense a LS current through the LS transistor;
wherein during operation of the power converter circuit, the current sensing circuit senses the HS and LS currents and generates therefrom a filtered voltage that is representative of a load current through the inductor, and
wherein the power converter circuit further comprises an error amplifier coupled to the filtered voltage, the error amplifier configured to generate an error signal that is configured to control an ON/OFF duty cycle of the power converter circuit.

21. The power converter circuit of claim 20, wherein:
the power converter circuit further comprises a current limit detector coupled to the filtered voltage, the current limit detector configured to generate a high current flag and/or a low current flag responsive to a detected high voltage level and/or a low voltage level of the filtered voltage.

22. The power converter circuit of claim 21, wherein:
the high and/or low current flags are configured to control gate voltages to the HS and/or LS transistors, thereby limiting high and/or low peaks of the load current.

23. A multi-phase power converter circuit, comprising:
a plurality of power conversion phases coupled to a common subcircuit, each phase of the plurality of power conversion phases comprising:
a high-side (HS) transistor and a low-side (LS) transistor coupled between a first voltage and a reference ground;
an inductor coupled, at a first terminal of the inductor, to a source of the HS transistor and to a drain of the LS transistor at a common switching node, and at a second terminal of the inductor, to the common subcircuit; and
a current sensing circuit coupled to the HS and LS transistors, the current sensing circuit comprising:
a high side (HS) current sensing circuit configured to sense a HS current through the HS transistor and
a low side (LS) current sensing circuit configured to sense a LS current through the LS transistor,
wherein during operation of the multiphase power converter circuit, the current sensing circuit of each phase senses the HS and LS currents and generates therefrom the filtered voltage that is representative of a phase load current through the inductor that is conducted to the common subcircuit.

24. The multiphase power converter circuit of claim 23, wherein:
each phase of the plurality of power conversion phases further comprises an error amplifier coupled to the filtered voltage, the error amplifier configured to generate an error signal that is configured to control an ON/OFF duty cycle of the each phase, the error signal based on a difference between the filtered voltage and a voltage representative of an average load current through the common subcircuit.

25. The current sensing circuit of claim 16, wherein:
a source of the HS transistor is coupled to a first input of the respective operational amplifier,
a source of the HS sensing transistor is coupled to a second input of the respective operational amplifier,
a gate of the HS sensing transistor is coupled to a gate of the HS transistor,
a drain of the HS sensing transistor is coupled to a drain of the HS transistor,
a source of the LS transistor is coupled to a first input of the respective operational amplifier,
a source of the LS sensing transistor is coupled to a drain of the LS transistor,
a gate of the LS sensing transistor is coupled to the gate of the LS transistor, and
a drain of the LS sensing transistor is coupled to a second input of the operational amplifier.

26. The current sensing circuit of claim 16, wherein:
the LS sensing circuit comprises an additional reduced size replica of the LS transistor and a current source coupled to a drain of the additional reduced size replica,
a source of the HS transistor is coupled to a first input of the respective operational amplifier,
a source of the HS sensing transistor is coupled to a second input of the respective operational amplifier,
a gate of the HS sensing transistor is coupled to a gate of the HS transistor,
a drain of the HS sensing transistor is coupled to a drain of the HS transistor,
a source of the LS transistor is coupled to a first input of the respective operational amplifier,
a source and a gate of the LS transistor are respectively coupled to a source and a gate of the additional reduced size replica,
a drain of the additional reduced size replica is coupled to a first input of the respective operational amplifier,
a drain of the LS sensing transistor is coupled to a second input of the respective operational amplifier,
a gate of the LS sensing transistor is coupled to the gate of the LS transistor, and
a source of the LS sensing transistor is coupled to a drain of the LS transistor.

27. The current sensing circuit of claim 18, wherein:
the LS sensing circuit further comprises a current mirror comprising a first leg, a second leg, and a common node that couples the first leg to the second leg,
the first leg is in series connection with the LS sensing transistor, and
an output of the respective operational amplifier of the LS sensing circuit is connected to the common node of the current mirror.

28. The current sensing circuit of claim 19, wherein:
the LS sensing circuit further comprises a current mirror comprising a first leg, a second leg, and a common node that couples the first leg to the second leg,
the first leg is in series connection with the LS sensing transistor, and
an output of the respective operational amplifier of the LS sensing circuit is connected to the common node of the current mirror.

29. A current sensing circuit for a power converter, comprising: (claims 1+2+10)
a high-side (HS) current sensing circuit comprising a HS sensing device configured to sense, during a HS sensing time interval, a HS current through a conducting HS transistor of the power converter;
a low-side (LS) current sensing circuit comprising a LS sensing device configured to sense, during a LS sensing time interval, a LS current through a conducting LS transistor of the power converter;
a current combiner circuit coupled to the HS and LS current sensing circuits, the current combiner circuit configured to combine the HS current and the LS current and generate therefrom a combined continuous sensing current;
an energy storage element directly or indirectly coupled to sensed HS and LS currents;
a current-to-voltage converter configured to convert sensed HS and LS currents to sensed HS and LS voltages, and
HS and LS slope detection circuits respectively coupled to the sensed HS and LS voltages and configured to detect a rate of change of said sensed voltages,
wherein the HS sensing time interval and the LS sensing time interval are separate and non-overlapping.

30. The current sensing circuit of claim 29, wherein:
the current combiner circuit further comprises a voltage-to-current converter configured to generate bridging currents during bridging time intervals between the HS sensing time interval and the LS sensing time interval.

31. The current sensing circuit of claim 30, wherein the current combiner circuit further comprises:
a HS current combiner switch that selectively conducts the sensed HS current to an output current node during the HS sensing time interval;
a LS current combiner switch that selectively conducts the sensed LS current to the output current node during the LS sensing time interval; and
a bridging current combiner switch that selectively conducts the bridging currents to the output current node during the bridging time intervals.

32. The current sensing circuit of claim 30, wherein:
the bridging time intervals comprise a first bridging time interval that follows the LS sensing time interval and leads to the HS sensing time interval, and a second bridging time interval that follows the HS sensing time interval and leads to the LS sensing time interval, and
the bridging currents generated during the first bridging time interval and during the second bridging time interval respectively comprise one or more bridging current segments.

33. The current sensing circuit of claim 32, wherein:
the one or more bridging current segments consists of a single current segment having a constant current value.

34. The current sensing circuit of claim 33, wherein:
the constant current value of the single current segment generated during the first bridging time interval is based on a value of the sensed LS voltage, and
the constant current value of the single current segment generated during the second bridging time interval is based on a value of the sensed HS voltage.

35. The current sensing circuit of claim 32, wherein:
the one or more bridging current segments consist of two current segments having respective first and second slopes, the first slope based on a rate of change of one of the sensed HS or LS voltages, and the second slope based on a rate of change of the other.

* * * * *